United States Patent
Sakurai et al.

(10) Patent No.: US 6,410,611 B1
(45) Date of Patent: Jun. 25, 2002

(54) ACTIVE ENERGY RAY CURABLE COMPOSITION COMPRISED OF A MALEIMIDE DERIVATIVE AND A METHOD FOR CURING THE SAID CURABLE COMPOSITION

(75) Inventors: Yoshinobu Sakurai, Sakura; Atsushi Miyakawa, Yotsukaido; Hisatomo Yonehara, Sakura; Hidenobu Ishikawa, Ichihara; Katsuji Takahashi, Sakura, all of (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/079,523

(22) Filed: May 15, 1998

(30) Foreign Application Priority Data

| May 16, 1997 | (JP) | ............................. 9-126970 |
| Aug. 13, 1997 | (JP) | ............................. 9-218770 |
| Aug. 19, 1997 | (JP) | ............................. 9-222402 |
| Mar. 26, 1998 | (JP) | ............................. 10-079678 |

(51) Int. Cl.$^7$ .......................... C07D 207/448; C08F 2/48
(52) U.S. Cl. ......................... 522/103; 522/107; 522/136
(58) Field of Search ............................... 522/103, 107, 522/136; 528/492, 314, 292

(56) References Cited

U.S. PATENT DOCUMENTS

| 3,729,446 A | 4/1973 | Holub et al. | |
| 3,920,618 A | 11/1975 | Ichimura et al. | |
| 4,079,041 A | 3/1978 | Baumann et al. | |
| 5,034,279 A | 7/1991 | Wilson, Jr. et al. | |
| 5,446,073 A | 8/1995 | Jonsson et al. | 522/104 |
| 6,034,150 A | * 3/2000 | Hoyle et al. | 522/63 |
| 6,271,339 B1 | 8/2001 | Thepot et al. | 528/310 |
| 6,306,923 B1 | 10/2001 | Thepot et al. | 522/107 |

FOREIGN PATENT DOCUMENTS

| EP | 0 021 019 | 1/1981 |
| EP | 0 349 645 | 1/1990 |
| EP | 0618237 A1 | 10/1994 |
| JP | 51-47940 | 10/1974 |
| JP | 50-123138 | 9/1975 |
| JP | 58-89609 | 5/1983 |
| JP | 61-250064 | 11/1986 |
| JP | 62-64813 | 3/1987 |
| JP | 62-79243 | 4/1987 |
| WO | WO 98/07759 | 8/1997 |
| WO | WO 98/07759 | 2/1998 |
| WO | WO 98/11151 | 3/1998 |
| WO | WO 98/11152 | 3/1998 |
| WO | WO 98/39247 | 1/1999 |

OTHER PUBLICATIONS

S.C. Clark et al., "Photinitiated Polymerization of Acrylates Using Functional Maleimides", Polymer Preprints, vol. 37, No. 2, pp. 348–349 (1996).

Sonny Jönsson et al., "Photochemistry of N–Substituted Maleimides", RadTech 96, pp. 377–392 (1996).

C. Decker et al., "RTIR Kinetic Study Of the Photo–Induced Polymerization of N–Substituted Maleimides", Polym. Mater. Sci. Eng., 75, pp. 198–199 (1996).

Polymeric Materials Science and Engineering, vol. 72, pp. 470–472 (1995), Jonsson et al.

RadTech Europe 95 Exhibition & Conference on Radiation Curing, pp. 34–56 (1995), Jonnson et al.

Sonny Jönsson et al., "Direct Photolysis of Donor—Acceptor Complexes . . . ", RadTech 94, pp. 194–210 (1994).

Cherylyn Lee et al., "Photocopolymerizations of Electron–Rich Olefins with Electron–Poor Olefins . . . ", Macromolecules 1989, vol. 22, pp. 21–25 (1989).

M. Shimose et al., "Photopolymerization of Mixtures . . . ", ACS Polymer Preprints 36, pp. 485–486 (1985).

(List continued on next page.)

*Primary Examiner*—Jeffrey Mullis
(74) *Attorney, Agent, or Firm*—Armstrong, Westerman & Hattori, LLP

(57) ABSTRACT

Objects of the present invention are the provision of an active energy ray curable composition which can be cured in the absence of a photoinitiator, and which can also be cured at practical light intensities and irradiating energy, and a method for curing the said curable composition; in which the composition comprises a maleimide derivative represented by formula (1):

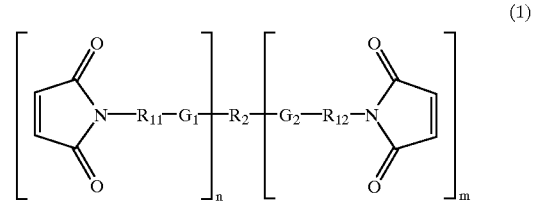

(1)

wherein
m and n each represent an integer of 1 to 5, and the total of m and n is 6 or smaller, $R_{11}$ and $R_{12}$ each represent a linking group selected from the group consisting of ① an alkylene group, ② an alicyclic group, ③ an arylalkylene group, and ④ a cycloalkylalkyene group, $G_1$ and $G_2$ each represent an ester linkage selected from the group consisting of —COO— and —OCO—, $R_2$ represents a linking chain having an average molecular weight of 100 to 100,000 selected from the group consisting of (A) a (poly)ether linking chain and (B) a (poly)ester linking chain, in which at least one organic group selected from the group consisting of ① a straight chain alkylene group, ② a branched alkylene group, ③ an alkylene group having a hydroxyl group, ④ an alicyclic group, ⑤ an aryl group, and ⑥ an arylalkylene group is connected via at least one linkage selected from the group consisting of (a) an ether linkage and (b) an ester linkage.

11 Claims, No Drawings

OTHER PUBLICATIONS

Kurt G. Olson et al., "Stereochemical Evidence for Participation of a Donor–Acceptor . . . ", Macromolecules, vol. 17, pp. 2480–2486 (1984).

Kurt G. Olson et al., "Stereochemical Evidence for Participation of a Donor–Acceptor . . . ", Macromolecules, vol. 17, pp. 2486–2501 (1984).

Frank S. Bates et al., "Stereochemical Evidence for the Participation of a Comonomer Charge–Transfer . . . ", Macromolecules, vol. 16, pp. 707–710 (1983).

"Photopolymerization of Maleimide And Its N–Substituted Derivatives", Polymers Letters, vol. 6, pp. 883–888 (1968), Yamada et al.

"Photoinitiator Free Polymerization of Maleimides and Vinyl Ethers," by Charles E. Hoyle et al., *ACS Symposium Series*, vol. 673 (1997), pp. 133–149.

"Photoinitiated Polymerization of Acrylates Using Functional Maleimides," by S.C. Clark et al., vol. 37, No. 2 (1996), pp. 348–349.

* cited by examiner

ACTIVE ENERGY RAY CURABLE COMPOSITION COMPRISED OF A MALEIMIDE DERIVATIVE AND A METHOD FOR CURING THE SAID CURABLE COMPOSITION

BACKGROUND OF THE INVENTION

The present invention relates to an active energy ray curable composition comprising a maleimide derivative, which is useful for various coatings, inks for printings, surface finishes, moldings, laminated plates, adhesives, and binders. More specifically, the present invention relates to an active energy ray curable composition comprising a maleimide derivative which can be cured in the absence of a photoinitiator under irradiation of ultraviolet light with practical intensity and energy value of irradiating light, and a method for curing the said curable composition.

BACKGROUND ART

An active energy ray curable composition polymerized under irradiation of active energy rays such as ultraviolet light, visible light, and the like, has an advantage of being rapidly cured. Therefore, active energy ray curable compositions are widely used as paints, inks for printing, adhesives, coatings, and the like. However, conventional active energy ray curable compositions cannot initiate polymerization alone upon irradiation of an active energy ray; therefore, it is necessary to use a photoinitiator together therewith. When a photoinitiator is used in large quantities, curing rapidly progresses. Therefore, large quantities of a photoinitiator tend to be used.

As photoinitiators, compounds having an aromatic ring, are used in general because they effectively absorb ultraviolet light. The photoinitiators have problems such as yellowing of cured materials upon addition of heat or light. Moreover, compounds of low molecular weight are commonly used as photoinitiators because solubility of a photoinitiator to active energy ray curable monomers and/or oligomers is necessary to initiate photopolymerization effectively. A photoinitiator having low molecular weight has high vapor pressure; therefore, many photoinitiators tend to give off unpleasant odors at room temperature to 150° C. Because infrared light in addition to ultraviolet light is generated from an ultraviolet light lamp, one of the light sources of active energy rays, active energy ray curable compositions are substantially heated upon irradiation with many ultraviolet light lamps arranged side by side. Therefore, unpleasant odors are given off from photoinitiators, and as a result, the working environment becomes worse.

Unreacted or decomposed photoinitiators remain in the cured compositions after irradiation of active energy ray curable compositions containing photoinitiators with active energy rays; therefore, problems are caused such as changing the color thereof to yellow, giving off unpleasant odors, and the like, when the cured compositions are exposed to light or heat. In particular, when a material at high temperature, such as a thermal head, contacts the active energy ray curable composition comprising a photoinitiator, strong unpleasant odor is given off. Moreover, when the cured composition after irradiation of an active energy ray curable composition containing a photoinitiator is contacted by water, unreacted photoinitiator is exuded; therefore, it is unsuitable to use the active energy ray curable composition as wrapping for food.

In order to solve these problems, a curable resin comprising a polymer with polymerizable unsaturated acrylic group and an organic solvent-soluble styrene containing an acrylic thermoplastic resin are disclosed in JP-A-58-89609 (the terms "JP-A-58-89609" as used herein mean "unexamined published Japanese patent applications") as an active energy ray curable composition without a photoinitiator. Photopolymerizable adhesive compositions comprising a copolymer of methacrylate monomer and/or methyl acrylate and a photopolymerizable monomer are disclosed in World Patent No. 89-05827.

Moreover, a photopolymerizing method in which maleimide compound is used as an electron acceptor for a charge-transfer complex which is formed by the electron acceptor and an electron donor, is disclosed in U.S. Pat. No. 5,446,073 and Polymer Preprints, vol. 37, No.2, pp. 348–349, 1996.

In addition, it was reported that the maleimide derivatives can polymerized in the absence of photoinitiators under irradiation of UV light in Polymer Letters, vol. 6, pp. 883–888, 1968. The active energy ray curable compositions comprising maleimide derivatives are disclosed in JP-A-61-250064, JP-A-62-64813, and JP-A-62-79243. The alkylmaleimides and arylmaleimides are used in these well-known documents, however, the maleimide derivatives in the documents show low photoinitiator properties; therefore it is necessary to use substantial amounts of a photoinitiator together with the maleimides.

It is well-known that pendant type maleimides can be crosslinkable by UV irradiation ([2+2]-photocycloaddition reaction). For example, photopolymerizable polymers having an α-aryl substituted maleimide group at a side chain are disclosed in U.S. Pat. No. 3,920,618, JP-A-50-123138, and JP-A-51-47940. The polymers having side chain type maleimide group having an alkyl substituent are disclosed in U.S. Pat. No. 4,079,041 and Europe Pat. No. 21019. These pendant type maleimides cannot be used in formation of liner polymers by photopolymerization; therefore, they are commonly used to prepare a negative printing plate. Moreover, these pendant type maleimides have some problems that a photocross-linking dimerization reaction needs rather long time (several tens seconds to several minutes) with an excess amount of irradiation energy.

In addition, photocurable compositions comprising maleimide derivatives as electron acceptors and vinyl ethers as electron donors are reported in Polymer Materials Science and Engineering, vol. 72, pp. 470–472, 1995 and Proceedings of RadTech Europe 95, pp. 34–56, 1995. The photopolymerizable compositions comprising 1,4-bis(vinyloxymethyl)cyclohexane and N-cyclohexylmaleimide or the photopolymerizable compositions comprising 4-hydroxybutyl vinyl ether and N-(hydroxyalkyl)maleimide are disclosed in these documents. They are polymerized upon UV-irradiation in the absence of a photoinitiator, however, hardening of the coated films cannot occur; i.e. the coated films maintain liquid states after UV-irradiation.

Maleimides such as N,N'-4,9-dioxa-1,12-bismaleimidedodecane are disclosed in Polymer Preprints, vol.37, No. 2, pp. 348–349, 1996 as a photoinitiator for polymerization of 1,6-hexanediol diacrylate and polyethylene glycol 400 diacrylate. However, there are serious problems that many of these maleimides are solid and are hardly dissolved in acrylates.

The photocurable compositions disclosed in JP-A-58-89609 and World Pat. No. 89-05827 have a problem that they cannot be sufficiently cross-linked by a practical irradiation energy.

Moreover, the polymerizing methods disclosed in U.S. Pat. No. 5,446,073 and Polymer Preprints, vol. 37, No. 2, pp. 348–349, 1996 have a problem in that high irradiation intensity is necessary to cure sufficiently. Many maleimide derivatives disclosed in the documents are solid at ambient temperature, and moreover, it does not suggest whether the maleimide compounds are homo-polymerized upon irradiation of UV-light in the absence of a photoinitiator in the documents. The documents disclose that specified maleimide derivatives react with vinyl ethers and acrylates in the absence of photoinitiators. However, it is difficult to obtain cured coatings with practical properties by the polymerization method disclosed in the former. From the view points of solubility to unsaturated compounds, it is also difficult to obtain cured coatings in wide range of the compositions by the polymerization method disclosed in the latter.

In addition, the maleimide derivatives disclosed in *Polymer Letters,* vol. 6, pp. 883–888, 1968 are solid at ambient temperature, and it is impossible to obtain the cured coating with practical properties by polymerization of the maleimide derivatives in solid state.

The polymers having a maleimide group as a side chain disclosed in U.S. Pat. No. 3,920,618, JP-A-50-123138, JP-A-51-47940, U.S. Pat. No. 4,079,041, and Europe Pat. No. 21019 can be used for formation of negative patterns by photocross-linking; however they cannot be used for forming coatings. In addition, they need higher irradiation energy than practical amounts of light-irradiation for cross-linking (photodimerization).

Therefore, the problem to be solved in the present invention is to provide an active energy ray curable compound which does not comprise a photoinitiator causing an unpleasant odor in curing, yellowing of cured coatings, and exuding of materials from the cured films. In addition, the purpose of the present investigation is to provide an active energy ray curable compound which can be cured with a practical light intensity and an energy value of irradiating light, being liquid state at ambient temperature, and to provide a method for curing the said curable composition.

DISCLOSURE OF THE INVENTION

As the result of extensive investigations directed to solve the problems described above, the present inventors found that the problems can be solved by using specific maleimide derivatives, and thereby reached the present invention.

That is, in order to solve the problems, the present invention provides an active energy ray curable composition comprising a maleimide derivative represented by formula (1):

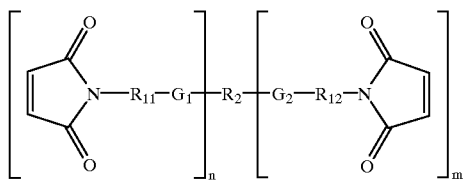

(1)

(in formula, m and n each represent an integer of 1 to 5, and the total of m and n is 6 or smaller, $R_{11}$ and $R_{12}$ each represent a linking group selected from the group consisting of ① an alkylene group, ② an alicyclic group, ③ an arylalkylene group, and ④ a cycloalkylalkyene group, $G_1$ and $G_2$ each represent an ester linkage represented by —COO— or —OCO—, $R_2$ represents a linking chain having an average molecular weight of 100 to 100,000 selected from the group consisting of (A) a (poly)ether linking chain and (B) a (poly)ester linking chain, in which at least one organic group selected from the group consisting of ① a straight chain alkylene group, ② a branched alkylene group, ③ an alkylene group having a hydroxyl group, ④ an alicyclic group, ⑤ an aryl group, and ⑥ an arylalkylene group is connected via at least one linkage selected from the group consisting of (a) an ether linkage and (b) an ester linkage.)

Moreover, in order to solve the problems, the present invention provides an active energy ray curable composition comprising (I) the maleimide derivative represented by formula (1), and (II) a compound copolymerizable with a maleimide group.

In addition, in order to solve the problems, the present invention provides a method for curing the active energy ray curable compositions, comprising irradiation of the active energy ray curable compositions with an active energy ray in the absence of a photoinitiator; the active energy ray curable compositions are thereby polymerized.

The present invention relates to the active energy ray curable compositions comprising the maleimide derivative represented by formula (1).

In formula (1), m and n each represent an integer of 1 to 5, and the total of m and n is a integer of 6 or smaller, more preferably 2 to 6.

$R_{11}$ and $R_{12}$ each represent a linking group selected from the group consisting of ① an alkylene group, ② an alicyclic group, ③ an arylalkylene group, and ④ a cycloalkylalkyene group. The alkylene group may be straight or branched. The arylalkylene group and the cycloalkyl-alkylene group may have an aryl group or a cycloalkyl group at a main chain or a branched chain, respectively.

Examples of $R_{11}$ and $R_{12}$ include straight alkylene groups such as methylene group, ethylene group, trimethylene group, tetramethylene group, pentamethylene group, hexamethylene group, heptamethylene group, octamethylene group, nonamethylene group, decamethylene group, undecamethylene group, dodecamethylene group, and the like; alkylene groups having a branched alkyl group such as 1-methylethylene group, 1-methyl-trimethylene group, 2-methyl-trimethylene group, 1-methyl-tetramethylene group, 2-methyl-tetramethylene group, 1-methyl-pentamethylene group, 2-methyl-pentamethylene group, 3-methyl-pentamethylene group, neopentyl group, and the like; alicyclic groups such as cyclopentylene group, cyclohexylene group, and the like; arylalkylene groups having an aryl group at a main chain or a side chain such as benzylene group, 2,2-diphenyl-trimethylene group, 1-phenyl-ethylene group, 1-phenyl-tetraethylene group, 2-phenyl-tetraethylene group, and the like; cycloalkyl-alkylene group having an alicyclic group at a main chain or a side chain such as cyclohexyl-methylene group, 1-cyclohexyl-ethylene group, 1-cyclohexyl-tetraethylene group, 2-cyclohexyl-tetraethylene group, and the like. However, there are no particular limitations placed on these groups.

$R_2$ represents (A) a (poly)ether linking chain or (B) a poly)ester linking chain having an average molecular weight in a range of 100 to 100,000, in which at least one organic group selected from the group consisting of ① straight chain alkylene group, ② a branched alkylene group, ③ an alkylene group having a hydroxyl group, ④ an alicyclic group, ⑤ an aryl group, and ⑥ an arylalkylene group is connected via (a) an ether linkage or (b) an ester linkage. $R_2$ may be a linkage comprising an oligomer or a polymer containing these linkages as a repeating unit. When the average molecular weight of (A) a (poly)ether linking chain or (B) a (poly)ester linking chain is less than 100, curing properties thereof are worse. Even if the compositions are cured, a gel fraction of the cured composition tends to be lower. Therefore, it is not suitable that the average molecular weight thereof is less than 100. Moreover, the average molecular weight of $R_2$ is more than 100,000, a polyol or a polyester, a raw material for a linking chain, is solid in nature and shows poor solubility to common solvents at ambient temperature. Moreover, the obtained maleimide derivatives are solid and almost insoluble to common solvents, therefore, it is difficult to obtain a coated film before and after curing. Even if cured coating films are obtained, surfaces of the coatings show unevenness. Therefore, it is not suitable that the average molecular weight of $R_2$ thereof is more than 100,000.

Examples of the linking chain represented by $R_2$ include (a) a (poly)ether (poly)ol residue group having an average molecular weight of 100 to 100,000, and comprising a part in which at least one group selected from the group consisting of a straight chain alkylene group having 1 to 24 carbon atoms, a branched alkylene group having 2 to 24 carbon atoms, an alicyclic group having 3 to 24 carbon atoms, and an aryl group having 6 to 24 carbon atoms is connected with an ether linking chain or a repeating unit thereof, (b) a (poly)ester (poly)ol residue group having an average molecular weight of 100 to 100,000, and comprising a part in which at least one group selected from the group consisting of a straight chain alkylene group having 2 to 24 carbon atoms, a branched alkylene group having 2 to 24 carbon atoms, an alicyclic group having 3 to 24 carbon atoms, and an aryl group having 6 to 24 carbon atoms is connected with an ester linking chain or a repeating unit thereof, (c) a (poly)carboxylate {(poly)ether (poly)ol} ester having a polycarboxylic acid residue group at a terminal, obtained by esterification of (poly)ether (poly)ol with carboxylic acid having 2 to 6 carbon atoms (the term of "carboxylic acid having 2 to 6 carbon atoms" is abbreviated as a polycarboxylic acid hereinafter), which have an average molecular weight of 100 to 100,000, and comprising a part in which at least one group selected from the group consisting of a straight chain alkylene group having 1 to 24 carbon atoms, a branched alkylene group having 2 to 24 carbon atoms, an alicyclic group having 3 to 24 carbon atoms, and an aryl group having 6 to 24 carbon atoms is connected with an ether linking chain or a repeating unit comprising the parts, (d) a (poly)carboxylate {(poly)ester (poly)ol} ester having a polycarboxylic acid residue group at a terminal obtained by esterification of (poly)ester (poly)ol and polycarboxylic acid which have an average molecular weight of 100 to 100,000, and comprising a part in which at least one group selected from the group consisting of a straight chain alkylene group having 1 to 24 carbon atoms, a branched alkylene group having 2 to 24 carbon atoms, an alicyclic group having 3 to 24 carbon atoms, and an aryl group having 6 to 24 carbon atoms is connected with an ether and an ester linking chains, or a repeating unit comprising the parts, (e) a linking chain obtained by ring-open reaction of polyepoxides having an average molecular weight of 100 to 100,000, and comprising a part in which at least one group selected from the group consisting of a straight chain alkylene group having 1 to 24 carbon atoms, a branched alkylene group having 2 to 24 carbon atoms, an alicyclic group having 3 to 24 carbon atoms, and an aryl group having 6 to 24 carbon atoms is connected with an ether linking chain, or a repeating unit comprising the parts, and the like. However, there are no particular limitations placed on these linking chains.

Examples of (poly)ether (poly)ol constructing linking chain (a) described above include polyalkylene glycols such as polyethylene glycol, polypropylene glycol, polybutylene glycol, polytetramethylene glycol, and the like; modified alkylene glycols in which ethylene glycol, propanediol, propylene glycol, tetramethylene glycol, pentamethylene glycol, hexanediol, neopentyl glycol, glycerin, trimethyolpropane, pentaerythritol, diglycerin, ditrimethylolpropane, dipentaerythritol, and the like are modified by ethylene oxides, propylene oxides, butylene oxides, and tetrahydrofuran. Among these (poly)ether (poly)ols, modified alkylene glycols are preferable. In addition, examples of (poly)ether (poly)ol constructing the above linking chain (a) include hydrocarbon polyols such as a copolymer of ethylene oxide and propylene oxide, a copolymer of propylene glycol and tetrahydrofuran, a copolymer of ethylene glycol and tetrahydrofuran, polyisoprene glycol, hydrogenated polyisoprene glycol, polybutadiene glycol, hydrogenated polybutadiene glycol, and the like; polyhydric alcohol compounds such as polytetramethylene hexaglycerin ether (modified hexaglycerin by tetrahydrofuran), and the like. However, there are no particular limitations placed on these (poly)ether (poly)ols.

Examples of (poly)ester (poly)ol constructing the linking chain (b) described above include (poly)alkylene glycols such as polyethylene glycol, polypropylene glycol, polybutylene glycol, polytetramethylene glycol, ethylene glycol, propane diol, propylene glycol, tetramethylene glycol, pentamethylene glycol, hexane diol, neopentyl glycol, glycerin, trimethylolpropane, pentaerythritol, diglycerin, ditrimethylolpropane, dipentaerythritol, and the like which are modified by ε-caprolactone, γ-butyrolactone, δ-valerolactone, and methylvalerolactone; aliphatic polyester polyols which are synthesized by esterification of aliphatic dicarboxylic acids such as adipic acid, dimeric acid, and the like with polyols such as neopentyl glycol, methylpentanediol, and the like; aromatic polyester polyols which are synthesized by esterification of aromatic dicarboxylic acids such as terephthalic acid, and the like with polyols such as neopentyl glycol, and the like; ester compounds obtained by esterification of polyhydric alcohols such as polycarbonate polyol, acryl polyol, polytetramethylenehexaglyceryl ether (modified hexaglycerin by tetrahydrofuran), and the like with dicarboxylic acids such as fumaric acid, phthalic acid, isophthalic acid, itaconic acid, adipic acid, sebacic acid, maleic acid, and the like; compounds having polyol group such as monoglyceride obtained by transesterification of polyhydric alcohols such as glycerin with animal- and plant-fatty acid esters; and the like. However, there are no particular limitations placed on these (poly)ester(poly)ols.

Examples of (poly)carboxylate {(poly)ether (poly)ol} ester having polycarboxylic acid at a terminal, which forms the linking chain (c) described above include (poly)carboxylate {(poly)ether (poly)ol} esters having polycarboxylic acid at a terminal which are obtained by esterification of (1) polycarboxylic acids such as succinic acid, adipic acid, phthalic acid, hexahydrophthalic acid, tetrahydrophthalic acid, fumaric acid, isophthalic acid, itaconic acid, sebacic acid, maleic acid, trimellitic acid, pyromellitic acid, benzenepentacarboxylic acid, benzenehexacarboxylic acid, citric acid, tetrahydrofurantetracarboxylic acid, cyclohexanetricarboxylic acid, and the like with (2) (poly)ether(poly)ols disclosed in the above (a), and the like. However, there are no particular limitations placed on these esters.

Examples of (poly)carboxylate {(poly)ester (poly)ol} ester having polycarboxylic acid at a terminal, which forms the linking chain (d) described above include (poly)carboxylate {(poly)ester (poly)ol} ester having polycarboxylic acid at a terminal which is obtained by esterification of (1) polycarboxylic acids such as succinic acid, adipic acid, phthalic acid, hexahydrophthalic acid, tetrahydrophthalic acid, fumaric acid, isophthalic acid, itaconic acid, sebacic acid, maleic acid, trimellitic acid, pyromellitic acid, benzenepentacarboxylic acid, benzenehexacarboxylic acid, citric acid, tetrahydrofurantetracarboxylic acid, cyclohexanetricarboxylic acid, and the like with (2) (poly)ester(poly)ols disclosed in the above (b), and the like. However, there are no particular limitations placed on these esters.

Examples of (poly)epoxide forming the linking chain (e) described above include epichlorohydrin-modified bisphenol type epoxy resin synthesized by the reaction of (methyl) epichlorohydrin with bisphenol A, bisphenol F, modified ethylene oxide thereof, modified propylene oxide thereof; epichlorohydrin-modified hydrogenated hydrogenated bisphenol type epoxy resin synthesized by the reaction of (methyl)epichlorohydrin with hydrogenated bisphenol A and hydrogenated bisphenol F, and by the reaction of ethylene oxide-modified or propylene oxide-modified hydrogenated bisphenol A and bisphenol F; epoxy novolak resin; compounds obtained from the reaction of phenol, bisphenol, and the like with (methyl)epichlorohydrin; aromatic epoxy resin such as glycidyl ester of terephthalic acid, isophthalic acid, pyromellitic acid, and the like; polyglycidyl ethers synthesized from glycols such as (poly)ethylene glycol, (poly)propylene glycol, (poly)butylene glycol, (poly)tetramethylene glycol, neopentyl glycol, and from alkylene oxide-modified glycols thereof; polyglycidyl ethers synthesized from aliphatic polyhydric alcohols such as trimethylol propane, trimethylol ethane, glycerin, diglycerin, erythritol, pentaerythritol, sorbitol, 1,4-butane diol, 1,6-hexane diol, and the like, and from alkylene oxide-modified aliphatic polyhydric alcohols thereof; glycidyl esters synthesized from adipic acid, sebacic acid, maleic acid, itaconic acid, and the like; glycidyl ether of polyester polyol synthesized from polyhydric alcohol with polycarboxylic acid; copolymers such as glycidyl (meth)acrylate and methylglycidyl (meth)acrylate; aliphatic epoxy resin such as glycidyl ester of higher fatty acid, epoxidized linseed oil, epoxidized soybean oil, epoxidized castor oil, epoxidized polybutadiene; and the like. However, there are no particular limitations placed on these (poly)epoxides.

Among these linking chains, $R_2$ is preferably (1) a (poly)ether linking chain having an average molecular weight of 100 to 100,000, and comprising a repeating unit containing ① a straight chain alkylene group having 2 to 24 carbon atoms, ② a branched alkylene group having 2 to 24 carbon atoms, ③ an alkylene group having a hydroxyl group and having 2 to 24 carbon atoms, and/or ④ an aryl group having 6 to 24 carbon atoms; or (2) a (poly)ester linking chain having an average molecular weight of 100 to 100,000, and comprising a repeating unit containing ① straight chain alkylene group having 2 to 24 carbon atoms, ② branched alkylene group having 2 to 24 carbon atoms, ③ an alkylene group having a hydroxyl group and having 2 to 24 carbon atoms, and/or ④ an aryl group having 6 to 24 carbon atoms, more preferably (3) a (poly)ether linking chain having an average molecular weight of 100 to 100,000, and comprising a repeating unit containing ① a straight chain alkylene group having 2 to 24 carbon atoms, ② a branched alkylene group having 2 to 24 carbon atoms, or ③ an alkylene group having a hydroxyl group and having 2 to 24 carbon atoms, or (4) a (poly)ester linking chain having an average molecular weight of 100 to 100,000, and comprising a repeating unit containing ① straight chain alkylene group having 2 to 24 carbon atoms, ② a branched alkylene group having 2 to 24 carbon atoms, or ③ an alkylene group having a hydroxyl group and having 2 to 24 carbon atoms.

Maleimide derivative represented by formula (1) which is used for an active energy ray curable composition of the present invention can be synthesized by well-known technique from the reaction of, for example, (a) a maleimide compound (a-1) having a carboxyl group with a compound (a-2) reactable with the carboxyl groups, or from the reaction of (b) a maleimide compound (b-1) having a hydroxyl group with a compound (b-2) having a carboxyl group.

A maleimide compound (a-1) having a carboxyl group can be synthesized by well-known technique from the reaction of maleic anhydride with a primary amino carboxylic acid, represented by the following reaction formula. (for example, see D. H. Rich, et al., *Journal of Medical Chemistry*, vol. 18, pp. 1004–1010, 1975).

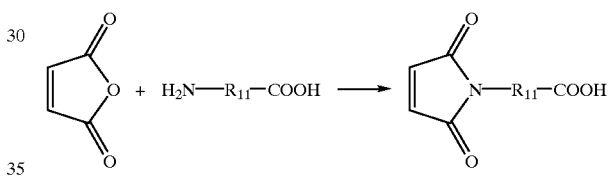

Moreover, a maleimide compound (b-1) having a hydroxyl group can be synthesized by maleimide and formaldehyde, represented by reaction formula

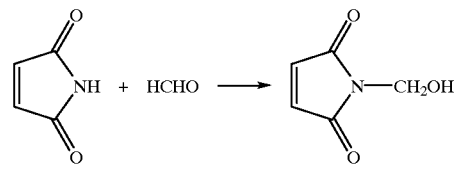

or by a well-known technique using maleic anhydride and a primary amino alcohol represented by the following reaction formula (for example, see U.S. Pat. No. 2,526,517 and JP-A-2-268155).

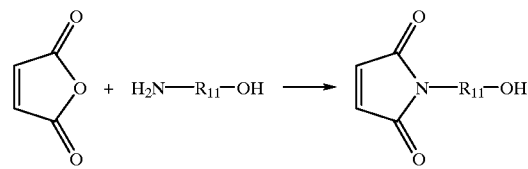

Examples of a primary amino carboxylic acid include asparagine, alanine, β-alanine, arginine, isoleucine, glycine, glutamine, tryptophan, threonine, valine, phenylalanine, homophenylalanine, α-methyl-phenylalanine, lysine, leucine, cycloleucine, 3-aminopropionic acid, α-aminobutyric acid, 4-aminobutyric acid, aminovaleric acid, 6-aminocaproic acid, 7-aminoheptanoic acid, 2-aminocaprylic acid, 3-aminocaprylic acid, 6-aminocaprylic acid, 8-aminocaprylic acid, 2-aminononanoic acid, 4-aminononanoic acid, 9-aminononanoic acid, 2-aminocapric acid, 9-aminocapric acid, 10-aminocapric acid, 2-aminoundecanoic acid, 10-aminoundecanoic acid, 11-aminoundecanoic acid, 2-aminolauric acid, 11-aminolauric acid, 12-aminolauric acid, 2-aminotridecanoic acid, 13-aminotridecanoic acid, 2-amino myristic acid, 14-amino myristic acid, 2-aminopentadecanoic acid, 15-aminopentadecanoic acid, 2-aminopalmitic acid, 16-aminopalmitic acid, 2-aminoheptadecanoic acid, 17-aminoheptadecanoic acid, 2-aminostearic acid, 18-aminostearic acid, 2-aminoeicosanoic acid, 20-aminoeicosanoic acid, aminocyclohexanecarboxylic acid, aminomethylcyclohexanecarboxylic acid, 2-amino-3-propionic acid, 3-amino-3-phenylpropionic acid, and the like. However, there are no particular limitations placed on these primary amino carboxylic acids. Any primary amino carboxylic acid can be used. In addition, pyrrolidone, lactams such as δ-valerolactam, ε-caprolactam, and the like can be used.

Examples of a primary amino alcohol include 2-aminoethanol, 1-amino-2-propanol, 3-amino-1-propanol, 2-amino-2-methyl-1-propanol, 2-amino-3-phenyl-1-propanol, 4-amino-1-butanol, 2-amino-1-butanol, 2-amino-3-methyl-1-butanol, 2-amino-4-methylthio-1-butanol, 2-amino-1-pentanol, 5-amino-1-pentanol, (1-aminocyclopentane)methanol, 6-amino-1-hexanol, 2-amino-1-hexanol, 7-amino-1-heptanol, 2-(2-aminoethoxy)ethanol, N-(2-aminoethyl)ethanol amine, 4-amino-1-piperazine ethanol, 2-amino-1-phenylethanol, 2-amino-3-phenyl-1-propanol, 1-aminomethyl-1-cyclohexanol, aminotrimethylcyclohexanol, and the like. However, there are no particular limitations placed on these primary amino alcohols. Any primary amino alcohol can be used.

Examples of compounds (a-2) reactive with the carboxyl groups include polyols or polyepoxides having 2 to 6 functional groups and an average molecular weight of 100 to 100,000 comprising a part or a repeating unit in which at least one linking group selected from the group consisting of a straight chain alkylene group, a branched alkylene group, an alicyclic group, and an aryl group is linked with an ether bond and/or an ester bond.

Examples of compounds (b-2) reactive with the hydroxyl groups include polycarboxylic acid having ether bonds and/or ester bonds in one molecule, and an average molecular weight of 100 to 100,000, and comprising a part or a repeating unit in which at least one linking group selected from the group consisting of a straight chain alkylene group, a branched alkylene group, an alicyclic group, and an aryl group is linked with an ether bond and/or an ester bond.

There are no particular limitations placed on the reaction between maleimide compounds (a-1) having a carboxyl group and polyols one of the compound (a-2) reactive with the carboxyl groups. Moreover, maleimide derivatives represented by formula (1) can be synthesized in a well-known manner disclosed in *Organic Synthesis Collective Volume* (C. E. Rehberg, et. al., vol. 3, pp. 46, 1955).

It is preferable that the reaction is carried out under ambient pressure or reduced pressure, at the temperature in a range of room temperature to 150° C., while dehydrating and using a catalyst. Examples of the catalyst include acid catalysts such as sulfuric acid, phosphoric acid, methane sulfonicacid, benzenesulfonic acid, p-toluenesulfonic acid, strong acidic cation-exchange resin, and the like. It is preferable to select an amount of the catalyst within a range of 0.01 to 10 wt % against the total weight of raw materials.

Moreover, an azeotropic organic solvent with water is also used as a solvent in the reaction. Examples of the azeotropic organic solvent with water include toluene, benzene, butyl acetate, ethyl acetate, diisopropyl ether, dibutyl ether, and the like.

There are no particular limitations placed on the reaction of the maleimide compounds (a-1) having a carboxyl group with polyepoxides which are one of the reactive compound (a-2) with the carboxyl groups. In addition, maleimide derivatives represented by formula (1) can be synthesized in a well-known manner disclosed in JP-A-4-228529.

It is preferable that the reaction is carried out at a temperature in a range of room temperature to 150° C., using a catalyst. Examples of the catalyst include imidazoles such as 2-methyimidazole and the like; quaternary ammonium salts such as tetramethyl ammonium chloride, trimethylbenzyl ammonium chloride, tetramethyl ammonium bromide, and the like; amines such as trimethylamine, triethylamine, benzylmethylamine, tributylamine, and the like; phosphines such as triphenylphosphine, tricyclohexylphosphine, and the like; laurates such as dibutyltin laurate, and the like; basic alkali metal salts such as potassium acetate, potassium tertiary phosphate, sodium acrylate, sodium methacrylate, and the like; alkali alcoholates such as sodium methylate, potassium ethylate, and the like; anion-exchange resins; and the like. It is preferable to select an amount of the catalyst within a range of 10 to 10,000 ppm against the total weight of raw materials.

Moreover, an organic solvent which does not comprise a reactive hydrogen may also be used as a solvent in the reaction. Examples of an organic solvent which does not comprise a reactive hydrogen include aromatic hydrocarbons such as toluene, ethylbenzene, tetralin, cumene, xylene, and the like; ketones such as acetone, methyl ethyl ketone, methyl isobutyl ketone, cyclohexanone, and the like; esters such as formate, methyl acetate, ethyl acetate, n-butyl acetate, and the like; and the like.

There are no particular limitations placed on the reaction between the maleimide compounds (b-1) having a hydroxyl group and the compounds (b-2) having a carboxyl group. In addition, maleimide derivatives represented by formula (1) can be synthesized in a well-known manner disclosed in *Organic Synthesis Collective Volume* (C. E. Rehberg, et al., vol. 3, pp. 46, 1955).

It is preferable that the reaction is carried out under ambient pressure or reduced pressure, at a temperature in a range of room temperature to 150° C., while dehydrating and using a catalyst. Examples of the catalyst include acid catalysts such as sulfuric acid, phosphoric acid, methanesulfonic acid, benzenesulfonic acid, p-toluenesulfonic acid, strong acidic cation-exchange resin, and the like. It is preferable to select an amount of the catalyst within a range of 0.01 to 10 w % against the total weight of raw materials.

In this case, as the solvent for the reaction, it is possible to use organic solvents which are azeotropic with water. Examples of such organic solvents are toluene, benzene, butyl acetate, ethyl acetate, diisopropyl ether, and dibutyl ether, and the like.

In any cases of the above reactions, it is preferable to use a radical polymerization inhibitor in order to suppress the radical polymerization of maleimide groups. The radical polymerization inhibitors include, for example, phenol derivatives such as hydroquinone, tert-butylhydroquinone, methoquinone, 2,4-dimethyl-6-tert-butylphenol, catecol, tert-butylcatecol, and the like; amines such as phenothiazine, p-phenylenediamine, diphenylamine and the like; copper complexes such as copper-dimethyldithiocarbamate, copper-diethyldithiocarbamate, copper-dibutyldithiocarbamate, and the like. These inhibitors may be used alone or in combinations of two or more. It is preferable to select an amount of the inhibitors within a range of 10 to 10,000 ppm against total weight of raw materials.

Examples of polyols used as a compound (a-2) reactive with the carboxyl groups include, for example, but are not limited to, polyalkylene glycols such as polyethylene glycol, polypropylene glycol, polybutylene glycol, polytetramethylene glycol, and the like; modified alkylene glycols modified of alkylene glycols such as ethylene glycol, propanediol, propylene glycol, butanediol, butylene glycol, hexanediol, neopentyl glycol, glycerin, trimethylolpropane, pentaerythritol, diglycerin, ditrimethylolpropane, dipentaerythritol, and the like by ethyleneoxide, propyleneoxide, butyleneoxide, tetrahydrofuran, ε-caprolactone, γ-butylolactone, δ-valerolactone, and methylvalerolactone; aliphatic polyols such as a copolymer of ethylene oxide with propylene oxide, a copolymer of propylene glycol with tetrahydrofuran, a copolymer of ethylene glycol with tetrahydrofuran, polyisoprene glycol, hydrogenated polyisoprene glycol, polybutadiene glycol, hydrogenated polybutadiene glycol, and the like; aliphatic polyester polyols which are the esterification reaction products of aliphatic dicarboxylic acids such as adipic acid and dimeric acid with polyols such as neopentyl glycol and methylpentanediol, and the like; aromatic polyester polyols which are the esterification reaction products of aromatic dicarboxylic acids such as terephthalate with polyols such as neopentyl glycols; polycarbonate polyols; acrylpolyols; polyhydric alcohols such as polytetramethylenehexaglycerin ether (tetrahydrofuran-modified hexaglycerin); compounds containing monohydroxyl group or polyhydroxy groups, and having an ether group at terminal ends of the polyhydric alcohols described above; compounds containing polyhydroxyl group obtained by the esterification reaction of the above polyhydric alcohols with dicarboxylic acids such as fumaric acid, phthalic acid, isophthalic acid, itaconic acid, adipic acid, sebacic acid, maleic acid, and the like; compounds containing polyhydroxyl groups obtained by the transesterification reaction of compounds containing polyhydroxyl groups such as glycerin with ester of fatty acids of animals and plants. Any polyols may be used if they contain 2 to 6 hydroxyl groups in the molecule.

Examples of polyepoxides used as the compound (a-2) reactive with the carboxyl groups include, for example, bisphenol-type epoxy resins modified by epichlorohydrin, which are synthesized by (methyl)epichlorohydrin with biphenol A, and bisphenol F, and their modified compounds by ethyleneoxide, propyreneoxide, and the like; hydrogenated bisphenol-type epoxy resins and epoxy novolak resins modified by epichlorhydrin which are synthesized by (methyl)epichlorohydrin with hydogenated bisphenol A, hydogenated bisphenol F, and their modified compounds by ethyleneoxide, propyleneoxides, and the like; reaction products of (methyl)epichlorohydrin with phenol and biphenol; aromatic epoxy resins such as glycidyl esters of terephthalic acid, isophthalic acid, and pyrrolitic acid; polyglycidyl ethers of glycols such as (poly)ethylene glycol, (poly)propylene glycol, (poly)butylene glycol, (poly)tetramethylene glycol, and their alkyleneoxide-modified-products; glycidyl ethers modified of aliphatic polyhydric alcohols such as trimethylolpropane, trimethylolethane, glycerin, diglycerin, erythritol, pentaerythritol, sorbitol, 1,4-butanediol, 1,6-hexanediol, and their alkyleneoxide-modified compounds; glycidyl esters of carboxylic acids such as adipic acid, sebacic acid, maleic acid, and itaconic acid; glycidyl ethers of polyester polyols prepared by polyhydric alcohols and polycarboxylic acids; copolymers of glycidyl(meth)acrylate and methylglycidyl(meth)acrylate; aliphatic epoxy resins such as glycidyl esters of higher fatty acids, epoxidized linseed oil, epoxidized soybean oil, epoxidized castor oil, and epoxidized polybutadiene.

Examples of polycarboxylic acids as the compounds (b-2), having ether bonds and ester bonds, include, for example, but are not limited to, polycarboxylic acids obtained by esterification of dicarboxylic acids such as fumaric acid, phthalic acid, isophthalic acid, itaconic acid, adipic acid, sebacic acid, maleic acid, succinic acid, hexahydrophthalic acid, tetrahydrophthalic acid, pyromellitic acid, and dicarboxylic acid described above with polyols described above, and represented by formula,

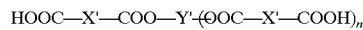

wherein, X' represents residual dicarboxyl groups, Y' represents residual polyol groups, and n is an integer from 1 to 5.

The maleimide derivatives represented by formula (1) and used for the active energy ray curable composition of the present invention are obtained by aforementioned preparing methods, but are not limited to, by the method described hereinbefore.

It is possible to add a compound which is copolymerizable with the maleimide groups to be used together in the active energy ray curable composition containing maleimide derivatives according to the present invention. Practical examples of the compounds which are copolymerizable with the maleimide groups are, for example, compounds having various unsaturated double bonds. Such compounds may include, for example, maleimide derivatives which are not represented by the above formula (1), (meth)acryloyl derivatives, (meth)acrylamide derivatives, vinyl ester derivatives, vinyl carboxylate derivatives, styrene derivatives, and unsaturated polyesters.

Examples of maleimide derivatives which are not represented by the above formula (1) include, for example, but are not limited to, monofunctional aliphatic maleimides such as N-methylmaleimide, N-ethylmaleimide, N-propylmaleimide, N-n-butylmaleimide, N-tert-butylmaleimide, N-pentylmaleimide, N-hexylmaleimide, N-laurylmaleimide, 2-maleimideethyl-ethylcarbonate, 2-maleimideethyl-isopropyl-carbonate, and N-ethyl-(2-maleimideethyl)carbamate; alicyclic monofunctional maleimides such as N-cyclohexylmaleimide; aromatic monofunctional maleimides such as N-phenylmaleimide, N-2-methylphenylmaleimide, N-2-ethylphenylmaleimide, N-(2,6-diethylphenyl)maleimide, N-2-chlorophenylmaleimide, and N-(4-hydroxyphenyl)maleimide; aliphatic bismaleimides such as N,N'-methylenebismaleimide, N-N'-ethylenebismaleimide, N,N'-trimethylenebismaleimide, N-N'-hexamethylenebismaleimide, N,N'-dodecamethylenebismaleimide, polypropylene glycol-bis(3-maleimidepropyl) ether, tetraethylene gycol-bis(3-maleimidepropyl) ether, and bis(2-maleimideethyl) carbonate; alicyclic bimaleimides such as 1,4-dimaleimidecyclohexane and isophoronebisurethanebis(N-ethylmaleimide); aromatic bismaleimides such as N,N'-(4,4'-diphenylmethane)bismalemide, N,N'-(4,4'-diphenyloxy) bismaleimide, N,N'-p-phenylenebismaleimide, N,N'-m-phenylenebismaleimide, N,N'-2,4-tolylenebismaleimide, N,N'-2,6-tolylenebismaleimide, N,N'-[4,4'-bis(3,5- dimethylphenyl)methane]bismaleimide, N,N'-[4,4'-bis(3,5-diethylphenyl)methane]bismaleimide; and (poly)urethane (poly)maleimide derivatives obtained by urethanation reactions of hydroxymaleimides with various (poly) isocyanates, such as a maleimide derivative obtained by a urethanation reaction of hydroxyethylmaleimide with triisocyanate produced by a reaction between 3 mol of isophoronediisocyanate and 1 mol of propyleneoxide-modified-glycerin; a maleimide derivative, obtained by a urethanation reaction of hydroxymethylmaleimide with diisocyanate produced by a reaction between 2 mol of 2,4-tolylendiisocyanate and 1 mol of polytetramethyleneglycol.

Compounds having acryloyloxy groups or methacryloyloxy groups can be classified into, but are not limited to, groups of (A-1); (poly)ester (meth)acrylate, (A-2); urethane (meth)acrylate, (A-3); epoxy (meth)acrylate, (A-4); (poly) ether (meth)acrylate, (A-5); alkyl (meth)acrylate or alkylene (meth)acrylate, (A-6); (meth)acrylate having an aromatic ring, and (A-7); (meth)acrylate having an alicyclic group.

Names in the above classification are used as the general terms for respective compounds which can be used together in the active energy ray curable composition of the present invention. The (poly)ester (meth)acrylate (A-1) generally designates (meth)acrylates having at least one ester bond in the main chain; urethane (meth)acrylate (A-2) generally designates (meth)acrylates having at least one urethane bond in the main chain; the epoxyacrylate (A-3) generally designates (meth)acrylates obtained by a reaction between (meth)acrylic acid and epoxide with one and more than one functional group; the (poly)ether(meth)acrylate (A-4) generally designate (meth)acrylates having at least one ether bond in the main chain; the alkyl(meth)acrylate or alkylene (meth)acrylate (A-5) generally designates (meth)acrylates comprising the main chain formed by a linear alkyl, a branched alkyl, a linear alkylene, or a branched alkylene, and side chains or terminal ends having halogen atoms and/or hydroxyl groups; (meth)acrylate having an aromatic ring (A-6) generally designates (meth)acrylates having an aromatic ring at the main chain or the side chain; (meth) acrylate having an alicyclic group (A-7) generally designates (meth)acrylates having, in the main chain or the side chain, alicyclic groups which may include oxygen atoms or nitrogen atoms as the structural unit.

Examples of the (poly)ester (meth)acrylates (A-1) which can be used together in the active energy ray curable composition of the present invention include, for example, but are not limited to, monofunctional (poly)ester(meth) acrylates such as alicyclic-modified neopentylglycol(meth) arylate ("R-629" or "R-644" produced by Nihon Kayaku Co.), caprolactone-modified 2-hydroxyethyl(meth)acrylate, ethyleneoxide- and/or propyleneoxide-modified phthalate (meth)acrylate, ethyleneoxide-modified succinate(meth) acrylate, caprolactone-modified tetrahydrofurfuryl(meth) acrylate; pivalateesterneopentylglycoldi(meth)acrylate, caprolactone-modified hydroxypivalateesterneopentylglucoldi(meth)acrylate, epichlorohydrine-modified phthalatedi(meth)acrylate; mono-, di- or tri-(meth)acrylates of triol obtained by addition of more than 1 mol of cyclic lactones such as ε-caprolactone, γ-butylolactone, δ-valerolactone or methylvalerolactone to 1 mol of trimethylolpropane or glycerin; mono-, di-, tri, or tetra-(meth)acrylates of triol obtained by addition of more than 1 mol of cyclic lactones such as ε-caprolactone, γ-butylolactone, δ-valerolactone or methylvalerolactone to 1 mol of pentaerythritol or ditrimethylolpropane; mono- or poly-(meth)acrylates of polyhydric alcohols such as triol, tetraol, pentaol, or hexaol, obtained by addition of more than 1 mol of cyclic lactones such as ε-caprolactone, γ-butylolactone, δ-valerolactone or methylvalerolactone to 1 mol of dipentaerythritol; (meth) acrylates of polyester polyols composed of diol components such as (poly)ethylene glycol, (poly)propylene glycol, (poly)tertamethylene glycol, (poly)butylene glycol, (poly) pentanediol, (poly)methylpentanediol, and (poly) hexanediol, and polybasic acids such as maleic acid, fumaric acid, succinic acid, adipic acid, phthalic acid, hexahydrophthalic acid, tetrahydrophthalic acid, itaconic acid, citraconic acid, hettic acid, chlorendic acid, dimeric acid, alkenylsuccinic acid, sebacic acid, azelaic acid, 2,2,4-trimethyladipic acid, 1,4-cyclohexanedicarboxylic acid, terephthalic acid, 2-sodium-sulfoterephthalic acid, 2-potassium sulfoterephthalic acid, isophthalic acid, 5-sodium sulfoisophthalic acid, 5-potassium sulfoisophthalic acid, orthophthalic acid, 4-sulfophthalic acid, 1,10-decamethylenedicarboxylic acid, muconic acid, oxalic acid, malonic acid, gultaric acid, trimellitic acid, pyromellitic acid; and polyfunctional (poly)ester(meth)acrylates composed of the above diol components, polybasic acids, and cyclic lactone-modified polyesterdiols such as ε-caprolactone, γ-butylolactone, δ-valerolactone or methylvalerolactone.

The urethane (meth)acrylate (A-2) which can be used together in the active energy ray curable composition of the present invention is a general term representing (meth) acrylates obtained by a reaction between hydroxy compounds having at least one acryloyloxy group (A-2-1) and isocyanate compounds (A-2-2).

Examples of hydroxy compounds having at least one acryloyloxy group (A-2-1) include, for example, 2-hydroxyethyl(meth)acrylate, 2-hydroxypropyl(meth) acrylate, 2-hydroxybutyl(meth)acrylate, 3-hydroxybutyl (meth)acrylate, 4-hydroxybutyl(meth)acrylate, cyclohexanedimethanolmono(meth)acrylate, polyethylene glycol(meth)acrylate, polypropylene glycol(meth)acrylate, trimethylolpropanedi(meth)acrylate, trimethylolethanedi (meth)acrylate, pentaerythritoltri(meth)acrylate or an adduct of (meth)acrylate with glycidyl(meth)acrylate, (meth) acrylate compounds having hydroxyl groups such as 2-hydroxy-3-phenolpropyl(meth)acrylate, and ring-opening reaction products of the above acrylate compounds having hydroxyl groups with ε-caprolactone.

Examples of isocyanate compounds (A-2-2) include, for example, aromatic diisocyanates such as p-phenylenediisocyanate, m-phenylenediisocyanate, p-xylenedilsocyanate, m-xylenediisocyanate, 2,4-tolylenediisocyanate, 2,6-tolylenediisocyanate, 4,4'-diphenylmethanediisocyanate, 3,3'-dimethyldiphenyl-4,4'-diisocyanate, 3,3'-diethyldiphenyl-4,4'-diisocyanate, and naphthalenediisocyanate; aliphatic or alicyclic diisocyanates such as isophoronediisocyanate, hexamethylenediisocyanate, 4,4'-dicyclohexylmethanediisocyanate, hydrogenated xylenediisocyanate, norbornenediisocyanate, and lysinediisocyanate; polyisocyanates such as buret products of more than one type of isocyanates and isocyanate-trimers of the above isocyanates; and polyisocyanates obtained by the esterification reaction of the above isocyanate with various polyols (A-2-3).

Examples of polyols (A-2-3) used to produce polyisocyanates include, for example, poly)alkylene glycols such as (poly)ethylene glycol, (poly)propylen glycol, (poly) butylene glycol, and (poly)tetramethylene glycol; alkyleneglycols modified by ethyleneoxide, propyleneoxide, butyleneoxide, tetrahydrofuran, ε-caprolactone, γ-butylolactone, δ-valerolactone or methylvalerolactone, such as ethylene glycol, propanediol, propylene glycol, tetramethylene glycol, pentamethylene glycol, hexanediol, neopentyl glycol, glycerin, trimethylolpropane, pentaerythritol, diglycerin, ditrimethylolpropane, and dipentaerythritol; aliphatic polyols such as copolymers of ethyleneoxide and propyleneoxide, copolymers of propylene glycol and tetrahydrofuran, copolymers of ethylene glycol and tetrahydrofuran, polyisoprene glycol, hydrogenated polyisoprene glycol, polybutadiene glycol, and hydrogenated polybutadiene glycol; aliphatic polyester polyols obtained by esterification reactions between aliphatic dicarboxylic acids such as adipic acid and dimeric acid with polyols such as neopentyl glycols and methylpentanediol; aromatic polyester polyols obtained by esterification reactions between aromatic dicarboxylic acids such as terephthalic acid with polyols such as neopentyl glycol; polycarbonatepolyols; acrylpolyols; polyhydric alcohols such as polytetramethylenehexaglyceryl ether (hexaglycerin modified by tetrahydrofuran); mono- or polyhydric compounds having of the above compounds having ether group at a terminal; polyhydric compounds obtained by esterification of the compounds having polyhydroxyl groups with dicarboxylic acids such as fumaric acid, phthalic acid, isophthalic acid, itaconic acid, adipic acid, sebacic acid, and maleic acid; compounds containing polyhydroxyl groups such as monoglyceride obtained by transesterification reactions of compounds having polyhydroxyl groups such as glycerin with esters of fatty acids of animals or plants.

Epoxy(meth)acrylates (A-3) capable of being used together in the active energy ray curable composition of the present invention is a general term for (meth)acrylate obtained by a reaction of epoxides having more than one functional group and (meth)acrylic acids. Epoxides (A-3-1) as the raw material of epoxy(meth)acrylate includes, for example, but are not limited to, epichlorhydrin-modified-hydrogenated bisphenol-type epoxy resin, synthesized by (methyl)epichlorohydrin and compounds such as hydrogenated bisphenol A, hydrogenated bisphenol S, hydrogenated bisphenol F, and their modified compounds with ethylene oxide or propylene oxide; alicyclic epoxy resins such as 3,4-epoxycyclohexylmethyl-3,4-epoxycyclohexanecarboxylate, bis-(3,4-epoxycyclohexyl) adipate; alicyclic epoxides such as epoxy resin containing heterocycles such as triglycidylisocyanurate; epichlorohydrine-modified bisphenyol-type epoxy resins synthesized by a reaction of (methyl)epichlorohydrin and a compound such as bisphenol A, bisphenol S, bisphenol F, and their modified compounds with ethylene oxide or propyleneoxide; phenol novolak-type epoxy resins; cresolnovolak-type epoxy resins; epoxy resins of dicyclopentadiene-modified phenol resin obtained by the reaction of dicyclopentadiene and various types of phenol resins; an aromatic epoxydized compounds of 2,2',6,6'-tertamethylbisphenol; aromatic epoxides such as phenylglycidyl ether; (poly)glycidyl ethers of glycol compounds such as (poly)ethylene glycol, (poly)propylene glycol, (poly)butylene glycol, (poly)tertramethylene glycol, neopentyl glycol; (poly)glycidyl ether of glycols modified with alkylene oxide; (poly)glycidyl ethers of aliphatic polyhydric alcohols such as trimethylolpropane, trimethylolethane, glycerin, diglycerin, erythritol, pentaerythritol, sorbitol, 1,4-butanediol, 1,6-hexanediol; alkylene type epoxides of (poly) glycidyl ether modified of aliphatic polyhyric alcohols by alkylene; glycidylesters of carboxylic acids such as adipic acid, sebacic acid, maleic acid, and itaconic acid; glycidyl ethers of polyesterpolyols of polyhydric alcohols with poly- carboxylic acids; a copolymer of gylcidyl(meth)acrylate or methylglycidyl(meth)acrylate; glycidylester of higher fatty acids; aliphatic epoxy resins such as an epoxydized linseed oil, an epoxydized castor oil, and an epoxydized polybutadiene.

(Poly)ether (meth)acrylates (A-4) capable of being used together in the active energy ray curable composition of the present invention include, for example, but are not limited to, monofunctional (poly)ether(meth)acrylates such as butoxyethyl(meth)acrylate, butoxytriethylene glycol(meth) acrylate, epichlorohydrin-modified butyl(meth)acrylate, dicyclopentenyloxylethyl(meth)acrylate, 2-ethoxyethyl (meth)acrylate, ethylcarbitol(meth)acrylate, 2-methoxy (poly)ethylene glycol (meth)acrylate, methoxy(poly) propylene glycol (meth)acrylate, nonylphenoxypolyethylene glycol (meth)acrylate, nonylphenoxypolypropylene glycol (meth)acrylate, phenoxyhydroxypropyl(meth)acrylate, phenoxy(poly) ethylene glycol (meth)acrylate, polyethylene glycol mono (meth)acrylate, polypropylene glycol mono(meth)acrylate, and polyethylene glycol/polypropylene glycol mono(meth) acrylate; alkylene glycol di(meth)acrylates such as polyethylene glycol di(meth)acrylate, polypropylene glycol di(meth)acrylate, polybutylene glycol di(meth)acrylate, polytetramethylene glycol di(meth)acrylate; polyfunctional (meth)acrylates induced by (meth)acrylic acid with aliphatic polyols such as a copolymer of ethylene oxide and propylene oxide, a copolymer of propylene glycol and tetrahydrofuran, a copolymer of ethylene glycol and tetrahydrofuran, polyisoprene glycol, hydrogenated polyisoprene glycol, polybutadieneglycol, hydrogenated polybutadiene glycol; polyfunctional (meth)acrylates induced by acrylic acid with polyhydric alcohols such as polytetramethylenehexaglyceryl ether (tetrahydrofuran-modified hexaglycerin); di(meth)acrylates of diol obtained by addition of equimolar or more than 1 mol of cyclic ethers such as ethylene oxide, propylene oxide, butylene oxide and/or tetrahydrofuran to 1 mol of neopentyl oxide; di(meth) acrylates of alkylene oxides-modified bisphenols such as bisphenol A, bisphenol F and bisphenol S; di(meth)acrylate of alkylene oxide-modified hydrogenated bisphenols such as hydrogenated bisphenol A, hydrogenated bisphenol F, hydrogenated bisphenol S; di(meth)acrylates of alkylene oxide-modified trisphenols; di(meth)acrylates of alkylene oxide-modified hydrogenated trisphenols; di(meth)acrylates of alkylene oxide-modified p,p'-bisphenols; di(meth) acrylates of alkylene oxide-modified hydrogenated bisphenols; di(meth)acylates of alkylene oxide-modified p,p'-dihydroxybenzophenones; mono-, di-, and tri-(meth) acrylates of triols obtained by addition of equimolar or more than 1 mol of ethylene oxide, propylene oxide, butylene oxide, and/or cyclic ethers such as tetrahydrofuran to 1 mol of trimethylolpropane or glycerin;

mono-, di-, tri- or tetra-(meth)acrylates obtained by addition of equimolar or more than 1 mole of ethylene oxide, propylene oxide, butylene oxide, and/or cyclic ethers such as tetrahydrofuran to 1 mol of pentaerythritol or ditrimethylolpropane; monofunctional (poly)ether(meth)acrylates or polyfunctional (poly)ether(meth)acrylates of polyhydric alcohols such as triol, tetraol, pentaol, or hexaol of mono- or poly-(meth)acrylates obtained by addition of equimolar or more than 1 mol of ethylene oxide, propylene oxide, butylene oxide, and/or cyclic ethers such as tetrahydrofuran to 1 mol of dipentaerythritol.

Alkyl(meth)acrylates or alkylene(meth)acrylates (A-5) which can be used together in the active energy ray curable composition of the present invention include, for example, but are not limited to, monofunctional (meth)acrylates such as methyl(meth)acrylate, ethyl(meth)acrylate, propyl(meth) acrylate, isopropyl(meth)acrylate, butyl(meth)acrylate, isobutyl(meth)acrylate, pentyl(meth)acrylate, isopentyl (meth)acrylate, neopentyl(meth)acrylate, hexyl(meth) acrylate, heptyl(meth)acrylate, 2-ethylhexyl(meth)acrylate, octyl(meth)acrylate, isooctyl(meth)acrylate, nonyl(meth) acrylate, decyl(meth)acrylate, dodecyl(meth)acrylate, tridecyl(meth)acrylate, pentadecyl(meth)acrylate, miristyl (meth)acrylate, palmityl(meth)acrylate, stearyl(meth) acrylate, neryl(meth)acrylate, geranyl(meth)crylate, farnecyl(meth)acrylate, hexadecyl(meth)acrylate, octadecyl (meth)acrylate, docosyl(meth)acrylate, and trans-2-hexene (meth)acrylate; di(meth)acrylates of aliphatic diols such as ethylene glycol di(meth)acrylate, propylene glycol di(meth) acrylate, 1,2-butylene glycol di(meth)acrylate, 1,3-butylene glycol di(meth)acrylate, 1,4-butanediol di(meth)acrylate, 1,6-hexanediol di(meth)acrylate, neopentyl glycol di(meth) acrylate, 2-methyl-1,8-octanediol di(meth)acrylate, 1,9-nonanediol di(meth)acrylate, and 1,10-decanediol di(meth) acrylate; mono(meth)acrylates or poly(meth)acrylates of polyhydric alcohols such as trimethylolpropane, (hereinafter, the term "poly" is used as the general term of the polyfunctionals including di, tri, tetra, and poly compounds such as mono(meth)acrylate, di(meth)acrylate, and tri(meth)acrylate of trimethylolpropane), and mono(meth) acrylates or poly(meth)acrylates of polyhydric alcohols such as triol, tetraol, and hexaol, for example, glycerin, pentaerythritol, ditrimethylolpropane, and dipentaerythritol; (meth)acrylates having hyroxyl groups such as 2-hydroxyethyl(meth)acrylate, 2-hydroxypropyl(meth) acrylate, 4-hydroxybutyl(meth)acrylate, 3-chloro-2-hydroxyethyl(meth)acrylate; (meth)acrylates having bromine atoms such as 2,3-dibromopropyl(meth)acrylate, tribromophenyl(meth)acrylate, ethylene oxide-modofied tribromophenyl(meth)acrylate, ethylene oxide-modified tetrabromobisphenol A di(meth)acrylate; (meth)acrylates having fluorine atoms such as trifluoroethyl(meth)acrylate, pentafluoropropyl(meth)acrylate, tetrafluoropropyl(meth) acrylate, octafluoropentyl(meth)acrylate, dodecafluoroheptyl(meth)acrylate, hexadecafluorononyl (meth)acrylate, hexafluorobutyl(meth)acrylate, 3-perfluorobutyl-2-hydroxypropyl(meth)acrylate, 3-perfluorohexyl-2-hydroxypropyl(meth)acrylate, 3-perfluorooctyl-2-hydroxypropyl(meth)acrylate, 3-(perfluoro-5-methylhexyl)-2-hydroxypropyl(meth) acrylate, 3-(perfluoro-7-methyloctyl)-2-hydroxypropyl (meth)acrylate, and 3-(perfluoro-8-methyldecyl)-2-hydroxypropyl(meth)acrylate.

(Meth)acrylates (A-6) having aromatic groups which can be used together in the active energy ray curable composition of the present invention include, for example, but are not limited to, monofunctional (meth)acrylates such as phenyl(meth)acrylate, benzylacrylate; and di(meth)acrylates such as bisphenol A diacrylate, bisphenol F diacrylate, bisphenol S diacrylate.

(Meth)acrylates (A-7) having alicyclic groups which can be used together in the active energy ray curable composition of the present invention include, for example, but are not limited to, monofunctional (meth)acrylates having alicyclic structures such as cyclohexyl(meth)acrylate, cyclopentyl(meth)acrylate, cycloheptyl(meth)acrylate, bicycloheptyl(meth)acrylate, isobornyl(meth)acrylate, bicyclopentyldi(meth)acrylate, tricyclodecyl(meth)acrylate, bicyclopentenyl(meth)acrylate, norbornyl(meth)acrylate, bicyclooctyl(meth)acrylate, tricycloheptyl(meth)acrylate, and cholesteroid-skeleton-substituted (meth)acrylate; di(meth)acrylates of hydrogenated bisphenols such as hydrogenated bisphenol A, hydrogenated bisphenol F, hydrogenated bisphenol S, di(meth)acrylates of hydrogenated trisphenols such as hydrogenated trisphenols, and di(meth)acrylates of hydrogenated p,p'-bisphenols; polyfuctional (meth)acrylates having cyclic structures such as dicyclopentane type di(meth)acrylate such as "Kayarad R684" (produced by Nihon Kayaku Co.), tricyclodecanedimethyloldi(meth)acrylate, bisphenolfluorenedihydroxy(meth)acrylate; and alicyclic acrylates having oxygen atoms and/or nitrogen atoms such as tetrahydrofurfuryl(meth)acrylate, and morpholinoethyl (meth)acrylate.

As compounds having acryloyl groups or methacryloyl groups which can be used together in the active energy ray curable composition of the present invention, it is possible to use, beside the above recited compounds, for example, poly(meth)acryl(meth)acrylates such as a reaction product of (meth)acrylic acid polymer and glycidyl(meth)acrylate, and a reaction product of glycidyl(meth)acrylate polymer and (meth)acrylic acid; (meth)acrylate having amino groups such as dimethylaminoethyl(meth)acrylate; isocyanul(meth) acrylates such as tris((meth)acryloxyethyl)isocyanurate; phosphagene(meth)acrylate such as hexakis[(meth) acryloyloxyethyl)cyclotriphosphagen]; (meth)acrylate having the skelton of polysiloxane; polybutadiene(meth) acrylate; and melamine (meth)acrylate. Among these compounds having acryloyl or methacryloyl groups, it is preferable to use the compounds having 1 to 6 acryloyl or methacryloyl groups.

(Meth)acrylamide derivatives which can be used together in the active energy ray curable composition of the present invention include, for example, monofuntional (meth) acrylamides such as N-isopropyl(meth)acrylamide and polyfunctional (meth)acrylamides such as methylenebis(meth) acrylamide.

Compounds having vinyl ether groups which can be used together in the active energy ray curable composition of the present invention can be classified into, but are not limited to, the following groups, in which, (B-1): an alkyl vinyl ether having a terminal group substituted with at least one selected from the group consisting of a hydrogen atom, a halogen atom, a hydroxyl group, and an amino group; (B-2): a cycloalkyl vinyl ether having a terminal group substituted with at least one selected from the group consisting of a hydrogen atom, a halogen atom, a hydroxyl group, and an amino group; (B-3): at least one vinyl ether selected from the group consisting of a monovinyl ether, a divinyl ether, and a polyvinyl ether in which a vinyl ether group is connected with alkylene group; and in which a vinyl ether group is connected with at least one group with and without substituent selected from the group consisting of alkyl group, cycloalkyl group, and aromatic group, via at least one linkage selected from the group consisting of an ether linkage, an urethane linkage, and an ester linkage.

Alkylvinyl ethers (B-1) which can be used together in the active energy ray curable composition includes, for example, but are not limited to, methyl vinyl ether, hydroxymethyl vinyl ether, chloromethyl vinyl ether, ethyl vinyl ether, 2-hydroxyethylvinylether, 2-chloroethylvinylether, diethyl aminoethyl vinyl ether, propyl vinyl ether, 3-hydroxypropyl vinyl ether, 2-hydroxypropyl vinyl ether, 3-chloropropyl vinyl ether, 3-aminopropyl vinyl ether, isopropyl vinyl ether, butyl vinyl ether, 4-hydroxybutyl vinyl ether, isobutyl vinyl ether, 4-aminobutyl vinyl ether, pentyl vinyl ether, isopentyl vinyl ether, hexyl vinyl ether, 1,6-hexanediol monovinyl ether, heptyl vinyl ether, 2-ethylhexyl vinyl ether, octyl vinyl ether, isooctyl vinyl ether, nonyl vinyl ether, isononyl vinyl ether, decyl vinyl ether, isodecyl vinyl ether, dodecyl vinyl ether, isododecyl vinyl ether, tridecyl vinyl ether, isotridecyl vinyl ether, pentadecyl vinyl ether, isopentadecyl vinyl ether, hexadecyl vinyl ether, octadecyl vinyl ether, methylene glycol divinyl ether, ethylene glycol divinyl ether, propylene glycol divinyl ether, 1,4-butanediol divinyl ether, 1,6-hexanediol divinyl ether, cyclohexanediol divinyl ether, trimethylolpropane trivinyl ether, and pentaerythritol tetravinyl ether.

Cycloalkyl vinyl ethers (B-2) which can be used together in the active energy ray curable composition of the present invention includes, for example, but are not limited to, cyclopropyl vinyl ether, 2-hydroxycyclopropyl vinyl ether, 2-chlorocyclopropyl vinyl ether, cyclopropylmethyl vinyl ether, cyclobutyl vinyl ether, 3-hydroxycyclobutyl vinyl ether, 3-chlorocyclobutyl vinyl ether, cyclobutylmethyl vinyl ether, cyclopentyl vinyl ether, 3-hydroxycyclopentyl vinyl ether, 3-chlorocyclopentyl vinyl ether, cyclopentylmethyl vinyl ether, cyclohexyl vinyl ether, 4-hydroxycyclohexyl vinyl ether, cyclohexylmethyl vinyl ether, 4-aminocyclohexyl vinyl ether, cyclohexanediol monovinyl ether, cyclohexanedimethanol monovinyl ether, and cyclohexanedimethanol divinyl ether.

Among (B-3) compounds which may be used together in the active energy ray curable composition of the present invention including monovinyl ethers, divinyl ethers, and polyvinyl ethers, in which the vinyl ether linkage connects with an alkylene group, and at least one group selected from a group consisting of an alkyl group, an alicyclic group and an aromatic group which may have a substituents connects with a linkage selected from a linkage consisting of an ether linkage, an urethane linkage, and an ester linkage, examples of the compounds (B-3-1) containing an ether linkage, for example, but are not limited to, ethylene glycol methyl vinyl ether, diethylene glycol monovinyl ether, diethylene glycol methylvinyl ether, diethylene glycol divinyl ether, triethylene glycol monovinyl ether, triethylene glycol methylvinyl ether, triethylene glycol divinyl ether, polyethylene glycol monovinyl ether, polyethylene glycol methylvinyl ether, polyethylene glycol divinyl ether, propylene glycol methylvinyl ether, dipropylene glycol monovinyl ether, dipropylene glycol methylvinyl ether, dipropylene glycol divinyl ether, tripropylene glycol monovinyl ether, tripropylene glycol methylvinyl ether, tripropylene glycol divinyl ether, polypropylene glycol monovinyl ether, polypropylene glycol methylvinyl ether, polypropylene glycol divinyl ether, tetramethylene glycol methylvinyl ether, di(tetramethylene glycol) monovinyl ether, di(tetramethylene glycol)methyl vinyl ether, di(tetramethylene glycol) divinyl ether, tri(tetramethylene glycol) monovinyl ether, tri(tetramethylene glycol) methylvinyl ether, tri(tetramethylene glycol) divinyl ether, poly(tetramethylene glycol) monovinyl ether, poly(tetramethylene glycol) methylvinyl ether, poly(tetramethylene glycol) divinyl ether, 1,6-hexanediolmethyl vinyl ether, di(hexamethylene glycol)monovinyl ether, dihexamethylene glycol) methylvinyl ether, di(hexamethylene glycol) divinyl ether, tri(hexamethylene glycol) monovinyl ether, tri(hexamethylene glycol) methylvinyl ether, tri(hexamethylene glycol) divinyl ether, poly(hexamethylene glycol) monovinyl ether, poly(hexamethylene glycol) methylvinyl ether, poly(hexamethylene glycol) divinyl ether.

Among compounds classified in the above (B-3) having vinyl ether linkages, the compounds having urethane linkages may be obtained by the urethanating reaction between (a) a monovinyl ether of poly)alkylene glycol having at least one hydroxyl group in one molecule and (b) a compound having at least one isocyanate group in one molecule.

Among these compounds, the monovinyl ether (a) of (poly)alkylene glycol include at least one hydroxyl group in a molecule, for example, 2-hydroxyethyl vinyl ether, diethylene glycol monovinyl ether, polyethylene glycol monovinyl ether, 3-hydroxypropyl vinyl ether, 2-hydroxy-2-methylethyl vinyl ether, dipropylene glycol monovinyl ether, polypropylene glycol monovinyl ether, 4-hydroxybutyl vinyl ether, and 1,6-hexanediol monovinyl ether.

On the other hand, compounds (b) having at least one isocyanate group in one molecule include, for example, aromatic diisocyanates such as m-isopropenyl-α,α-dimethylbenzylisocyanate, p-phenylenediisocyanate, m-phenylenediisocyanate, p-xylenediisocyanate, m-xylenediisocyanate, 2,4-tolylenediisocyanate, 2,6-tolylenediisocyanate, 4,4'-diphenylmethanediisocyanate, 3,3'-diethyldiphenyl-4,4'-diisocyanate, 3,3'-dimethyldiphenyl-4,4'-diisocyanate, naphthalenediisocyanate; and aliphatic and alicyclic isocyanates such as propylisocyanate, isophoronediisocyanate, hexamethylenediisocyanate, 4,4'-dicyclohexylmethanediisocyanate, hydrogenated xylenediisocyanate, norbornenediisocyanate, lysindiisocyanate.

It is also possible to use isocyanate compounds such as dimers or trimers comprising more than one of these isocyanate monomers, and to use adduct compounds obtained by urethanating reactions between isocyanate compounds containing more than 2 isocyanate groups in one molecule and various alcohols.

Various alcohols can be used for obtaining adduct products, if the alcohol contains at least one hydroxyl group. Although there is no limitation, it is preferable to use an alcohol with an average molecular weight of less than 100,000. Examples of such alcohols include, for example, methanol, ethanol, propanol, isopropanol, butanol, isobutanol, ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decanediol, 2,2',4-trimethyl-1,3-pentanediol, 3-methyl-1,5-pentanediol, dichloroneopentyl glycol, dibromoneopentyl glycol, neopentylglycol hydroxypivalate, cyclohexanedimethylol, 1,4-cyclohexanediol, spiro glycol, tricyclodecanedimethylol, hydrogenated bisphenol A, ethylene oxide-modified bisphenol A, propylene oxide-modified bisphenol A, dimethylol propionic acid, dimethylol butanoic acid, trimethylol ethane, trimethylolpropane, glycerin, 3-methylpentane-1,3,5-triol, tris(2-hydroxyethyl)isocyanurate.

Polyester-polyols, polyether-polyols, polycarbonate-polyols may be used for obtaining adduct products.

These alcohols can be used alone or in combinations of two or more.

Polyester-polyols obtained by reactions of the above polyol components and carboxylic acids may be used in preparing the adduct products. In regard to carboxylic acids, any conventional carboxylic acids or anhydrides thereof may be used. Examples of these carboxylic acids include, for example, maleic acid, fumaric acid, itaconic acid, citraconic acid, tetrahydrophthalic acid, hettic acid, chrolendick acid, dimeric acid, adipic acid, succinic acid, alkenylsuccinic acid, sebacic acid, azelaic acid, 2,2,4-trimethyladipic acid, 1,4-cyclohexanedicarboxylic acid, terephthalic acid, 2-sodiumsulfoterephthalic acid, 2-potassiumsulfoterephthalic acid, isophthalic acid; 5-sodiumsulfoisophthalic acid, 5-potassiumsulfoisophthalic acid; di-lower-alkylesters of 5-sodium-sulfoisophthalic acid such as dimethyl- or diethylesters of 5-sodium-sulfoisophthalic acid; orthophthalic acid, 4-sulfophthalic acid, 1,10-decamethylenecarboxylic acid, muconic acid, oxalic acid, malonic acid, glutaric acid, trimellitic acid, hexahydrophthalic acid, tetrabromophthalic acid, methylcyclohexenetricarboxylic acid or pyromellitic acid, anhydrides thereof and ester compounds of these acids with alcohols such as methanol and ethanol. It is also possible to use lactone-polyols obtained by the ring-opening reaction between ε-caprolactam and the above described polyols.

In regard to polyether polyols, conventional polyether polyols can be used in obtaining adduct products. Examples of such polyether-polyols are, for example, but are not limited to, ether glycols such as polytetramethylene glycol, propylene oxide-modified polytetramethylene glycol, ethylene oxide-modified polytetramethylene glycol, polypropylene glycol, polyethylene glycol, and polyether polyols obtained by ring-opening reactions of cyclic ethers by use of more than three functional polyols as an initiator.

Polycarbonate-polyols used in adduct products are obtained by the transesterification reactions of (c) carbonates and (d) various polyols. Examples of carbonates (c) are, for example, but are not limited to, diphenylcarbonate, bischlorophenylcarbonate, dinaphtylcarbonate, phenyl-tolyl-carbonate, phenyl-chlorophenyl-carbonate, and 2-tolyl-4-tolyl-carbonate; diaryl- or dialkyl-carbonates such as dimethylcarbonate and diethylcarbonate. Examples of polyols (d) which can be used in the above reaction include the alcohols, polyols, polyester polyols, and polyether polyols described above.

Compounds (B-3-3) having ester linkages classified in vinyl ether groups (B-3) can be obtained by the esterification reaction of (e) monovinyl ether of alkylene glycol having at least one hydroxyl group in a molecule with (f) a compound having at least one carboxyl group in a molecule.

Examples of (e) monovinyl ether of alkylene glycol having at least one hydroxyl group in a molecule are the same compounds as recited as (a) components of the above compounds having urethane bonds.

It is possible to use well-known carboxylic acids and anhydride thereof for the compounds having at least one carboxyl group in a molecule. Examples of the compound (f) having at least one carboxyl group in a molecule include, for example, but are not limited to, formic acid, acetic acid, propionic acid, valeic acid, benzoic acid, maleic acid, fumaric acid, itaconic acid, citraconic acid, tetrahydrophthalic acid, hettic acid, chlorendic acid, dimeric acid, adipic acid, succinic acid, alkenylsuccinic acid, sebacic acid, azelaic acid, 2,2',4-trimethyladipic acid, 1,4-cyclohexanedicarboxyl acid, terephthalic acid, 2-sodiumsulfoterephthalic acid, 2-potassiumsulfoterephthalic acid, isophthalic acid, 5-sodium-sulfoisophthalic acid, 5-potassiumsulfoisophthalic acid; di-lower-alkylesters of 5-sodium-sulfoisophthalic acid such as dimethyl- or diethylesters of 5-sodium-sulfoisophthalic acid, orthophthalic acid, 4-sulfophthalic acid, 1,10-decamethylenedicarboxylic acid, muconic acid, oxalic acid, malonic acid, glutaric acid, trimellitic acid, hexahydrophthalic acid, tetrabromophthalic acid, methylcyclohexenetricarboxylic acid or pyromellitic acid, and anhydrides of these compounds. In addition, carboxyl acids obtained by reactions between compounds having more than two carboxylic groups and various alcohols, which are used as (b) component among compounds having urethane linkages, and which is used in obtaining adduct products of isocyanate.

Vinyl carboxylate derivatives which can be used together in the active energy ray curable compositions include, for example, vinyl acetate and vinyl cinnamate. Styrene derivatives include, for example, styrene and divinylstyrene.

Unsaturated polyesters which can be used together in the active energy ray curable composition include, for example, maleates such as dimethylmaleate and diethylmaleate; fumarates such as dimethylfumarate and diethylfumarate; and esterification products of unsaturated polycarboxylic acids such as maleic acid and fumaric acid and polyhydric alcohols.

Unlimited combinations of one or more of any compounds can be used, without being limited to the compounds described hereinbefore, as curable compounds which can be used together in the active energy ray curable composition of the present invention, if the compounds are copolymerizable with maleimide group of the maleimide derivatives which is represented by the general formula (1).

Although there is no particular limitation in the ratio of maleimide derivatives which are not represented by formula (1) to the maleimide derivatives represented by formula (1), when both maleimide derivatives are used together in the active energy ray curable composition containing maleimide derivatives, it is preferable to select the ratio of maleimide derivative other than these represented by formula (1) equal or less than 95% by weight and more preferably equal or less than 90% by weight.

Although there is no limitation in the ratio of a compound having acryloyloxy or methacryloyloxy groups to the maleimide derivatives represented by formula (1), when used in the active energy ray curable composition of the present invention containing maleimide derivatives, it is preferable to use the compound having acryloyloxy or methacryloyloxy groups such that 100 parts by weight of the compounds having acryloyloxy or methacryloyloxy groups constitutes a ratio of equal or more than 5 parts by weight of maleimide derivatives represented by formula (1), and, more preferably, the ratio of equal or more than 20 parts by weight from the point of view of the curing speed.

When a compound having vinyl ether groups is used together in the active energy ray curable composition containing maleimide derivatives of the present invention, there is no limitation on the ratio to be incorporated in the composition. However, it is preferable to use the compound having vinyl ether groups such that 100 parts by weight of the compound having vinyl ether groups constitutes a ratio of equal or more than 5 parts by weight of maleimide derivatives represented by formula (1), and the use of equimolar amount of a vinyl ether group to a maleimide group is more preferable from points of view of the curing speed and a cured film property.

The active energy ray curable composition of the present invention has an intrinsic spectral sensitivity in a range of 200 to 400 nm, and it is possible to polymerize under a irradiation of ultraviolet or visible light within a range of 180 to 500 nn, even without use of a photoinitiator. It was observed that lights with wavelengths at 254 nm, 308 nm, 313 nm, and 365 nm are effective in curing of the active energy ray curable composition of the present invention. It is also possible to cure or polymerize the present active energy ray curable composition not only by the ultraviolet light but also by light other than the ultraviolet light and by heat. Moreover, it is possible to cure the present active energy ray curable composition in air and/or an inert gas.

Various light sources of the ultraviolet light and the visible light may be used such as, for example, a lowpressure-mercury lamp, a high-pressure-mercury-lamp, an ultrahigh-pressure-mercury lamp, a metal halide lamp, a chemical lamp, a black-light lamp, a mercury-xenon lamp, an excimer lamp, a short-arc lamp, a helium-cadmium laser, an argon laser, an excimer laser, and sunlight.

The active energy ray curable composition of the present invention can be cured under irradiation of ultraviolet light or visible light, in the absence of a photoinitiator. In order to effectively cure the composition of the present invention, conventional photoinitiators may be used for polymerization. The photoinitiators may be classified into two groups; one is an intramolecular-bond-cleavage type and the other is an intramolecular-hydrogen-abstraction type.

Examples of the intramolecular-bond-cleavage type photoinitiators include, for example, acetophenones such as diethoxyacetophenone, 2-hydroxy-2-methyl-1-phenylpropane-1-one, benzyldimethylketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino(4-thiomethylphenyl)propan-1-one, and 2-benzyl-2-dimethylamino-1-(4-morpholinophenyl)-butanone; benzoins such as benzoin, benzoinmethyl ether, benzoinisopropyl ether; acylphosphine oxides such as 2,4,6-trimethylbenzoindiphenylphosphine oxides; benzyl and methylphenylglyoxyester.

Examples of intramolecular-hydrogen-abstraction type photoinitiators include, for example, benzophenones such as benzophenone, methyl-4-phenylbenzophenone o-benzoylbenzoate, 4,4'-dichlorobenzophenone, hydroxybenzophenone, 4-benzoyl-4'-methyl-diphenylsulfide, acrylic-benzophenone, 3,3',4,4'-tetra(t-butylperoxycarbonyl)benzophenone, 3,3'-dimethyl-4-methoxybenzophenone; thioxanthones such as 2-isopropylthioxanthone, 2,4-dimethylthioxanthone, 2,4-diethylthioxanthone, 2,4-dichlorothioxanthone; aminobenzophenones such as Michler's ketone, 4,4'-diethylaminobenzophenone; 10-butyl-2-chloroacridone, 2-ethylanthraquinone, 9,10-phenanthrenequinone, and camphorquinone.

It is preferable to add the photoinitiator, if necessary, to the active energy ray curable composition within a range of 0.01 to 10.00% by weight.

Although the active energy ray curable composition of the present invention can be cured by irradiation of ultraviolet, it is also possible to use a light sensitizer for efficient curing.

Examples of such sensitizers are, for example, amines such as triethanolamine, methyldiethanolamine, triisopropanolamine, methyl 4-dimethylaminobenzoate, ethyl 4-dimethylaminobenzoate, isoamyl 4-dimethylaminobenzoate, (2-dimethylamino)ethyl benzoate, (n-butoxy)ethyl 4-dimethylaminobenzoate, and 2-ethylhexyl 4-dimethylaminobenzoate.

It is preferable to add the light sensitizer to the active energy ray curable composition within a range of 0.01 to 10.00% by weight.

It is possible to further use together, if necessary, additives such as non-reactive-compounds, inorganic fillers, organic fillers, coupling reagents, adhesive reagents, antifoaming reagents, leveling reagents, plasticizers, antioxidants, ultraviolet-absorbers, flame retardants, pigments, dyes, and paints.

Examples of the non-reactive compounds which are usable together in the active energy ray curable composition include, for example, but are not limited to, liquid or solid oligomers or resins with a low reactivity or non-reactivities such as, alkyl (meth)acrylate copolymer, epoxy resins, liquid polybutadiene, liquid polybutadiene derivatives, liquid chloroprene, liquid polypentadiene, dichloropentadiene derivative, saturated polyester oligomer, polyether oligomer, liquid polyamide, polyisocyanate oligomer, xylene resin, ketone resin, petroleum resin, rosin resin, fluorinate-type oligomer, silicone-type oligomer, polysulfide oligomers.

Inorganic and organic fillers are generally used for improving mechanical properties such as strength, cushioning and slipping properties.

Any conventional inorganic fillers may be used, which include, for example, but are not limited to, silicon dioxide, silicon oxide, calcium carbonate, calcium silicate, magnesium carbonate, magnesium oxide, talc, kaoline clay, calcined clay, zinc oxide, zinc sulfate, aluminum hydroxide, aluminum oxide, glass, mica, barium sulfate, alumina white, zeolite, silica spherules, and glass spherules. It is possible to add halogen groups, epoxy groups, hydroxyl groups, and thiol groups to these fillers by addition or by the reaction with various coupling reagents such as a silane coupling reagent, a titanate-type coupling reagent, an aluminum-type coupling reagent, a zirconate-type coupling reagent, and the like.

Conventional organic fillers may be used as the organic fillers in the active energy ray curable composition of the present invention, which include, for example, but are not limited to, a benzoguanamine resin, a silicone resin, a low-density polyethylene, a high-density polyethylene, a polyolefin resin, ethylene-acrylate copolymer, polystyrene, cross-linking polystyrene, polydivinylbenzene, styrene-divinylbenzene copolymer, acrylic copolymer, cross-linking acrylic resin, polymethylmethacrylate resin, vinylidene-chloride resin, fluororesin, nylon 12, nylon 11, nylon 6/66, phenolic resin, epoxy resin, urethane resin, and polyimide resin. It is possible to add halogen groups, epoxy groups, hydroxyl groups, and thiol groups to these organic fillers.

Examples of coupling reagents which can be used together in the active energy ray curable composition of the present invention include, for example, but are not limited to, silane coupling reagents such as γ-glycidoxypropyltrimethoxysilane, and γ-chloropropyltrimethoxysilane; titanate coupling reagents such as tetra(2,2-diaryloxymethyl-1-butyl)bis(ditridecyl) phosphitetitanate, and bis(dioctylpyrophophate) ethylenetitanate; aluminum coupling reagents such as acetoalkoxyaluminumdiisopropylate; zirconium coupling agents such as acethylacetone-zirconium complex and the like.

Regarding additives such as adhesive reagents, antifoaming reagents, leveling reagents, plasticizers, antioxidants, ultraviolet-absorbers, flame retardants, pigments, dyes, and paints, any corresponding conventional additives may be used together, without any limitation, in the active energy ray curable composition of the present invention, if the additives do not harm the characteristics of the resin including the curing property.

In order to obtain the active energy ray curable composition of the present invention, the aforementioned components may be mixed, the mixing order or mixing method are not limited.

It is substantially not necessary to use a solvent in the active energy ray curable composition of the present invention. However, for diluting the active energy ray curable composition of the present invention, it may possible to use conventional and generally known solvents including ketones such as methylethylketone and methylisobutylketone; acetates such as ethyl acetate and butyl acetate; aromatic hydrocarbons such as benzene, toluene, and xylene.

The active energy ray curable composition of the present invention is advantageously applicable for surface finishing, binders, plastic materials, molding materials, laminate plates, adhesives, bonding materials, and ink; coating materials for metals such as aluminum, iron, and copper; coating materials for plastics such as vinyl chloride, acryls, polycarbonate, polyethyleneterephthalate, and a acrylonitrilbutadienestyrene copolymer, polyethylene, and polypropylene; coating materials for ceramics such as glass; coating materials for other materials such as wood, paper, printing papers, and fibers.

The active energy ray curable composition of the present invention forms a cured film without a photoinitiator under irradiation of light. Since this active energy ray curable composition of the present invention does not generate odor during curing, and the cured film of this composition does not incur yellowing and odor, and an amount of elution from this cured film is quite low, the present composition can be advantageously applied to a field of inks such as lithographic ink, flexo-ink, gravure ink, and screen ink, and to fields of gloss varnish, paper coating, wood painting, beverage can coating, printing, soft package coating, adhesives for printed papers and laminates, lavel coating, printing ink or adhesives, thermosensible paper, printing ink or coating for thermosensible paper, food package coating, printing ink, adhesives, and binders, which are directly contacted with a consumer.

EXAMPLES

Next, the present invention will be more specifically explained by manufacturing examples, examples, and comparative examples. However, the present invention is not limited to these examples.

Manufacturing Example 1

65.5 g of 6-aminocaproic acid and 400 ml of acetic acid were added in a 1 liter-three-neck-flask equipped with a dropping funnel, a reflux condenser, and a stirrer, and then the solution comprising 49.0 g of maleic anhydride and 300 ml of acetic acid was added dropwise from the dropping funnel at r.t. for 2 hours, stirring during the reaction. After addition of maleic anhydride-solution, the reaction was continued for 1 hour. The precipitate was filtered off, and was recrystallized from methanol to give 111 g of N-(5-carboxyl pentyl)-maleamic acid.

Next, 45.8 g of N-(5-carboxyl pentyl)-maleamic acid, 40.4 g of triethylamine, and 500 ml of toluene were added in a 1 liter three-neck-flask equipped with a Dean-Stark apparatus and a stirrer, and was reacted for 1 hour under reflux, stirring and removing the evolved water. The residue obtained by removing toluene from the reaction mixture was acidified to pH 2 with 0.1 N HCl, extracted with 100 ml of ethyl acetate for three times, and dried with magnesium sulfate. The ethyl acetate was evaporated under reduced pressure and the residue was recrystallized from water, whereby 19 g—pale yellow crystals of maleimidocaproic acid were obtained.

The properties of maleimidocaproic acid were as follows;

$^1$H NMR (nuclear magnetic resonance spectrum) (400 MHz, dimethyl sulfoxide (DMSO)-d6): 12.1 ppm(s,1H, COOH), 7.0 ppm(s,2H,—C=C—), 3.4 ppm(t,2H,—CH$_2$—), 2.1 ppm(t,2H,—CH$_2$—), 1.5 ppm(m,6H,—CH$_2$CH$_2$CH$_2$—)

IR (infrared absorption spectrum): 3170 cm$^{-1}$(—COOH), 1710 cm$^{-1}$(C=O), 830 cm$^{-1}$, 696 cm$^{-1}$(—C=C—)

Elemental analysis (CHN): Calcd. C,56.8%; H,6.16%; N,6.30% Found C,56.8%; H,6.20%; N,6.50%.

Manufacturing Example 2

23 g of maleimidoundecanoic acid was obtained in the same manner as Manufacturing Example 1, except that 102 g of 11-aminoundecanoic acid was used instead of 65.5 g of 6-aminocaproic acid and the residue was purified by recrystallization from methanol.

The properties of maleimidoundecanoic acid were as follows;

$^1$H NMR (400 MHz, DMSO-d6): 12.1 ppm(s,1H,COOH), 7.0 ppm(s,2H,—C=C—), 3.4 ppm(t,2H,—CH$_2$—), 2.1 ppm(t,2H,—CH$_2$—), 1.4~1.6 ppm(m,16H,—CH$_2$—)

IR: 3170 cm$^{-1}$(—COOH), 1710 cm$^{-1}$(C=O), 830 cm$^{-1}$, 696 cm$^{-1}$(—C=C—)

Elemental analysis (CHN): Calcd. C,64.1%; H,8.19%; N,4.98% Found C,63.9%; H,8.22%; N,5.02%.

Manufacturing Example 3

33.3 g of 36%-formaldehyde aqueous solution and 19.4 g of maleimide were added in a 100 ml reaction flask equipped with a reflux condenser and a magnetic stirrer, and then refluxed at 100° C. for 1 hour. After the reaction was finished, the precipitate formed by concentrating the reaction mixture to approximately 25 ml was filtered. 14.2 g of white crystals of N-hydroxymethylmaleimide were obtained by recrystallizing the precipitate from approximately 120 ml of 2-propanol.

The properties of N-hydroxymethylmaleimide were as follows;

$^1$H NMR (400 MHz, DMSO-d6): 6.7 ppm(s,2H,—HC=CH—), 6.2 ppm(t,1H,—OH), 4.8 ppm(d,2H,—CH$_2$—)

IR: 3390 cm$^{-1}$(OH), 1708 cm$^{-1}$(C=O), 696 cm$^{-1}$(—CH=CH—)

Elemental analysis (CHN): Calcd. C,47.2%; H,3.94%; N,11.0% Found C,47.1%; H,3.85%; N,10.8%.

Manufacturing Example 4

10 g of 2-maleimido-2-methyl acetic acid was obtained in the same manner as Manufacturing Example 1, except that 44.5 g of α-alanine was used instead of 65.5 g of 6-aminocaproic acid and the residue was purified by recrystallization from toluene.

The properties of 2-maleimido-2-methyl acetic acid were as follows;

$^1$H NMR (300 MHz, DMSO-d6): 7.1 ppm(s,2H,—C=C—), 4.8 ppm(q,1H,—C—), 1.5 ppm(q,3H,—CH$_3$), IR: 3170 cm$^{-1}$(—COOH), 1746 cm$^{-1}$, 1710 cm$^{-1}$(C=O), 831 cm$^{-1}$, 697 cm$^{-1}$(—C=C—)

Elemental analysis (CHN): Calcd. C,49.7%; H,4.14%; N,8.28% Found C,49.5%; H,4.38%; N,8.02%.

Manufacturing Example 5

11 g of maleimidoacetic acid was obtained in the same manner as Manufacturing Example 1, except that 37.5 g of glycine was used instead of 65.5 g of 6-aminocaproic acid and the residue was purified by recrystallization from 70% aqueous methanol solution.

The properties of maleimidoacetic acid were as follows;

$^1$H NMR (300 MHz, DMSO-d6): 7.0 ppm(s,2H,—C═C—), 4.1 ppm(s,2H,—CH$_2$—)

IR: 3170 cm$^{-1}$(—COOH), 1750 cm$^{-1}$, 1719 cm$^{-1}$(C═O), 831 cm$^{-1}$, 696 cm$^{-1}$(—C═C—)

Elemental analysis (CHN): Calcd. C,46.5%; H,3.87%; N,9.03% Found C,46.2%; H,4.05%; N,8.70%.

Manufacturing Example 6

20 g of polytetramethylene glycol having a molecular weight (MW) of 1,000 {marketed by Hodogaya Chemical Co., Ltd.; trade name: PTGL1000 (Mn and Mw estimated by GPC using polystyrene standard are 2,100 and 5,000, respectively. The abbreviated terms of "MW", "GPC", "Mn", and "Mw" indicate "nominal number-average molecular weight from a Maker", "Gel Permeation Chromatography", "number-average molecular weight", and "weight-average molecular weight", respectively.)}, 9.8 g of maleimidocaproic acid synthesized in Manufacturing Example 1, 1.2 g of p-toluenesulfonic acid, 0.06 g of 2,6-tert-butyl-p-cresol, and 15 ml of toluene were added in a 200 ml reaction flask equipped with a Dean-Stark apparatus, and then reacted at 80° C. for 4 hours under reduced pressure (240 torr), stirring and removing formed water during the reaction. The reaction mixture was dissolved in 200 ml of toluene, followed by three times-wash with 100 ml of saturated sodium hydrogen carbonate aqueous solution and by a wash with 100 ml of saturated sodium chloride aqueous solution. 18 g—pale yellow maleimide derivative (A) represented by formula (3) was obtained after removed of toluene under reduced pressure.

The properties of maleimide derivative (A) were as follows;

IR: 1733 cm$^{-1}$, 1710 cm$^{-1}$(C═O), 830 cm$^{-1}$, 696 cm$^{-1}$ (C═C)

$^1$H NMR (400 MHz, CDCl$_3$): 6.7 ppm(s,4H,—CH═CH—), 4.1 ppm[t,4H,—(C═O)—O—CH$_2$—], 3.5 ppm(t,4H,N—CH$_2$—), 3.3~3.5 ppm(m,—O—CH$_2$—), 2.3 ppm(t, 4H,—CO—CH$_2$—), 1.5~1.7 ppm(m,—CH$_2$—)

$^{13}$C NMR (100 MHz, CDCl$_3$): 173 ppm[—(C═O)—O], 171 ppm(N—C═O), 134 ppm(—CH═CH—), 69.1~70.8 ppm(—O—CH$_2$—), 37.5 ppm(N—CH$_2$—), 33.6 ppm(—CH$_2$—C═O), 34.0 ppm, 24.3 ppm, 23.0 ppm(—CH$_2$—), Elemental analysis (CHN): Calcd; C,63.6%; H,10.9%; N,2.0% Found C,64.5%; H,9.70%; N,2.0%.

Molecular weight distribution by GPC: Mn: 1,400 Mw: 3,400

Manufacturing Example 7

17 g—pale yellow maleimide derivative (B) represented by formula (4)

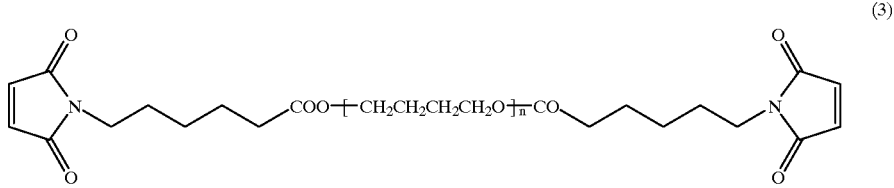

(3)

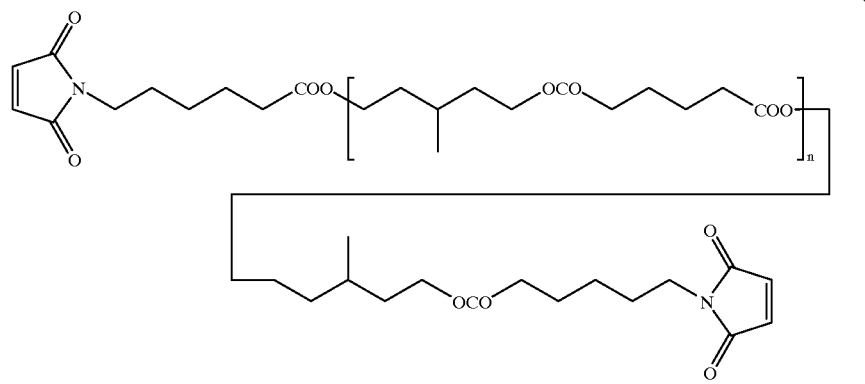

(4)

was obtained in the same manner as Manufacturing Example 6, except that 20 g of poly(methylpentanediolazipate) having a MW of 1,000 (marketed by Kuraray Co., Ltd.; trade name: Kurapole P-1010; Mn: 2,700, Mw: 4,700) was used instead of 20 g of polytetramethylene glycol having a MW of 1,000.

The properties of maleimide derivative (B) were as follows;

IR: 1737 cm$^{-1}$, 1709 cm$^{-1}$(C=O), 828 cm$^{-1}$, 696 cm$^{-1}$ (C=C)

$^1$H NMR (400 MHz, CDCl$_3$): 6.7 ppm(s,4H,—CH=CH—), 4.1~4.4 ppm[m,—(C=O)—O—CH$_2$—], 3.5 ppm(t,4H,N—CH$_2$—), 2.1~2.4 ppm[m,—O—CH$_2$—, —(C=O)—CH$_2$—, —CH$_2$—CH(CH$_3$)—], 1.2~1.9 ppm [m,—CH$_2$—, CH$_2$—CH(CH$_3$)—], 1.0~1.1 lppm(m,—CH$_3$)

$^{13}$C NMR (100 MHz, CDCl$_3$): 172~173 ppm[—(C=O)—O], 171 ppm[N—(C=O)], 134 ppm(—CH=CH—), 62.1 ppm(—O—CH$_2$—), 41.4 ppm[CH$_2$—CH(CH$_3$)—], 38.2 ppm(N—CH$_2$—), 33.8~35.1 ppm[—CH$_2$—(C=O)], 24.3~30.1 ppm(—CH$_2$—), 26.5 ppm[CH$_2$—CH(CH$_3$)—CH$_2$], 19.5~21.5 ppm(—CH$_3$)

Elemental analysis (CHN): Calcd. C,61.3%; H,7.91%; N,2.01% Found C,58.7%; H,7.70%; N,1.70%.

Molecular weight distribution by GPC: Mn: 880 Mw: 1,100

Manufacturing Example 8

17 g—pale yellow maleimide derivative (C) represented by formula (5)

Co., Ltd.; trade name: Sunnix GP1000; Mn: 2,100, Mw: 2,100) was used instead of 20 g of polytetramethylene glycol having a MW of 1,000.

The properties of maleimide derivative (C) were as follows;

IR: 1710 cm$^{-1}$(C=O), 831 cm$^{-1}$, 696 cm$^{-1}$(C=C)

$^1$H NMR (400 MHz, CDCl$_3$): 6.7 ppm(s,6H,—CH=CH—), 5.0 ppm[m,3H,—(C=O)—O—CH], 3.3~3.5 ppm(m,N—CH$_2$—, —O—CH$_2$—), 2.3 ppm[t,6H,—(C=O)—CH$_2$—], 1.3~1.7 ppm(m,—CH$_2$—), 1.1~1.2 ppm (m,—CH$_3$)

$^{13}$C NMR (100 MHz, CDCl$_3$): 173 ppm[—(C=O)—O], 171 ppm(N—C=O), 134 ppm(—CH=CH—), 72.8~77.5 ppm(—O—CH), 69.5~71.8 ppm(—O—CH$_2$—), 37.6 ppm (N—CH$_2$—), 34.2 ppm[—CH$_2$—(C=O)], 28.2 ppm, 26.2 ppm, 24.4 ppm(—CH$_2$—), 16.8~17.2 ppm(—CH$_3$)

Elemental analysis (CHN): Calcd. C,60.8%; H,8.6%; N,2.6% Found C,62.2%; H,9.8%; N,2.0%.

Molecular weight distribution by GPC: Mn: 2,300 Mw: 2,400

Manufacturing Example 9

48 g—pale yellow maleimide derivative (D) represented by formula (6)

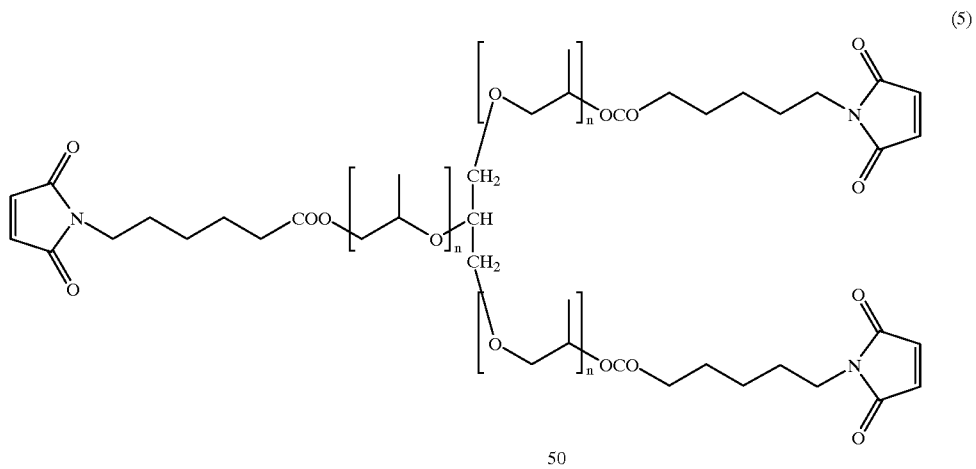

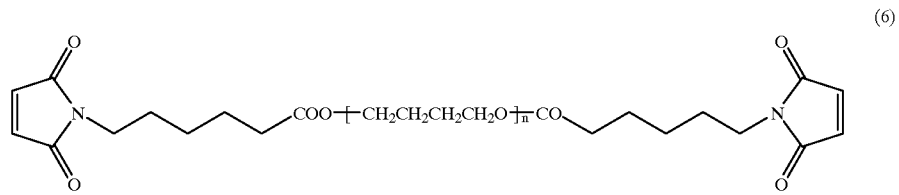

was obtained in the same manner as Manufacturing Example 6, except that 13.3 g of glycerin modified by propylene glycol having a MW of 1,000 (marketed by Sanyo Kasei was obtained in the same manner as Manufacturing Example 6, except that 80 g of polytetramethylene glycol having a MW of 4,000 (marketed by Hodogaya Chemical Co., Ltd.;

trade name: PTGLA4000; Mn: 18,000, Mw: 22,000) was used instead of 20 g of polytetramethylene glycol having a MW of 1,000.

The properties of maleimide derivative (D) were as follows;

IR: 1735 cm$^{-1}$, 1712 cm$^{-1}$(C=O), 830 cm$^{-1}$, 696 cm$^{-1}$ (C=C)

$^1$H NMR (400 MHz, CDCl$_3$): 6.7 ppm(s,4H,—CH=CH—), 4.1 ppm[t,4H,—(C=O)—O—CH$_2$—], 3.5 ppm(t,4H,N—CH$_2$—), 3.3~3.5 ppm(m,—O—CH$_2$—), 2.3 ppm[t,4H,—(C=O)—CH$_2$—], 1.5~1.7 ppm(m,—CH$_2$—)

$^{13}$C NMR (100 MHz, CDCl$_3$): 173 ppm[—(C=O)—O], 171 ppm[N—(C=O)], 134 ppm(—CH=CH—), 69.1~70.8 ppm(—O—CH$_2$—), 37.5 ppm(N—CH$_2$—), 33.6 ppm[—CH2—(C=O)], 34.0 ppm, 24.3 ppm, 23.0 ppm(—CH$_2$—)

Elemental analysis (CHN): Calcd. C,65.7%; H,11.0%; N,0.6% Found C,64.4%; H,10.3%; N,0.8%.

Molecular weight distribution by GPC: Mn: 13,000 Mw: 16,000

Manufacturing Example 10

22 g—pale yellow maleimide derivative (E) represented by formula (7)

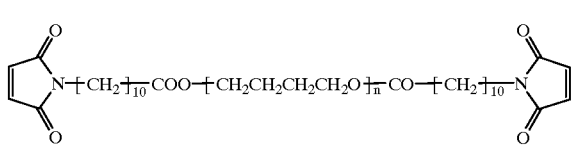

was obtained in the same manner as Manufacturing Example 6, except that 12.5 g of maleimidoundecanoic acid obtained in Manufacturing Example 2 was used instead of 9.8 g of maleimidocaproic acid.

The properties of maleimnide derivative (E) were as follows;

IR: 1733 cm$^{-1}$, 1710 cm$^{-1}$(C=O), 830 cm$^{-1}$, 696 cm$^{-1}$ (C=C)

$^1$H NMR (400 MHz, CDCl$_3$): 6.7 ppm(s,4H,—CH=CH—), 4.1 ppm[t,4H,—(C=O)—O—CH$_2$—], 3.5 ppm(t,4H,N—CH$_2$—), 3.3~3.5 ppm(m,—O—CH$_2$—), 2.3 ppm[t,4H,—(C=O)—CH$_2$—], 1.5~1.7 ppm(m,—CH$_2$—)

$^{13}$C NMR (100 MHz, CDCl$_3$): 173 ppm[—(C=O)—O], 171 ppm[N—(C=O)], 134 ppm(—CH=CH—), 69.1~70.8 ppm(—O—CH$_2$—), 37.5 ppm(N—CH$_2$—), 33.6 ppm[—CH$_2$—(C=O)], 34.0 ppm, 24.3 ppm, 23.0 ppm(—CH$_2$—)

Elemental analysis (CHN): Calcd. C,66.5%; H,10.0%; N,1.84% Found C,67.7%; H,9.03%; N,2.01%.

Molecular weight distribution by GPC: Mn: 1,600 Mw: 3,500

Manufacturing Example 11

30 g—pale yellow maleimide derivative (F) represented by formula (8)

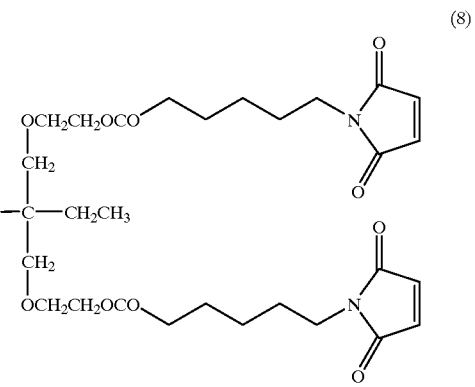

was obtained in the same manner as Manufacturing Example 6, except that 11.2 g of trimethylolpropane modified by three equivalent of ethylene oxide, 35 g of maleimidocaproic acid obtained in Manufacturing Example 1, 1.6 g of p-toluenesulfonic acid, 0.08 g of 2,6-tert-butyl p-cresol, and 15 ml of toluene were added in a 200 ml reaction flask equipped with a Dean-Stark apparatus.

The properties of maleimide derivative (F) were as follows;

IR: 1736 cm$^{-1}$, 1705 cm$^{-1}$(C=O), 830 cm$^{-1}$, 696 cm$^{-1}$ (C=C)

$^1$H NMR (400 MHz, CDCl$_3$): 6.7 ppm(s,6H,—CH=CH—), 4.0 ppm(t,6H,—C=O—O—CH$_2$—), 3.3~3.5 ppm(m,N—CH$_2$—, O—CH$_2$—), 2.3 ppm[t,6H,—(C=O)—CH$_2$—], 1.6~1.7 ppm(m,12H,—CH$_2$—), 1.5 ppm(q,2H,C—CH$_2$—), 1.3 ppm(m,6H,—CH$_2$—), 0.89 ppm(t,3H,—CH$_3$)

$^{13}$C NMR (100 MHz, CDCl$_3$): 173 ppm[—(C=O)—O], 171 ppm[N—(C=O)], 134 ppm(—CH=CH—), 70.8 ppm, 69.0 ppm, 63.6 ppm(—O—CH$_2$—), 40.6 ppm(C), 37.5 ppm(N—(CH$_2$—), 33.9 ppm[—CH$_2$—(C=O)], 28.2 ppm, 26.2 ppm, 24.3 ppm, 23.0 ppm(—CH$_2$—), 7.3 ppm(—CH$_3$)

Elemental analysis (CHN): Calcd. C,59.6%; H,6.98%; N,4.97% Found C,59.3%; H,6.75%; N,5.23%.

Molecular weight distribution by GPC: Mn: 970 Mw: 1,200

Manufacturing Example 12

23.8 g of bisphenol A modified by epichrolhydrin (marketed by Dainippon Ink and Chemicals Inc.; trade name: Epichron 840S; Mn: 465, Mw: 510), 0.10 g of 2,6-tert-butyl p-cresol, and 0.02 g of 2-methylimidazole were added in a 100 ml three-neck-flask equipped with a reflux condenser and a stirrer, and then 29.5 g of maleimidocaproic acid synthesized in Manufacturing Example 1 was added dropwise for 3 hours while stirring at 90° C. under nitrogen. After 4 hours, the reaction was terminated when the acid value of the reactant was approximately 0. Thereby, 50 g—pale yellow maleimide derivative (G) represented by formula (9)

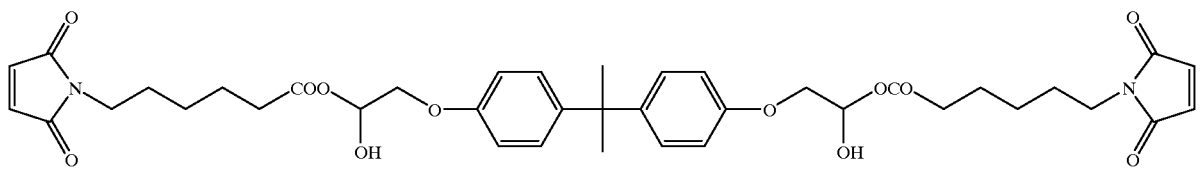

(9)

was obtained.

The properties of maleimide derivative (G) were as follows;

IR: 3460 cm$^{-1}$(OH), 1705 cm$^{-1}$(C=O), 830 cm$^{-1}$, 696 cm$^{-1}$(C=C)

$^1$H NMR(400 MHz,CDCl$_3$): 7.1 ppm(d,4H,O—Ph), 6.8 ppm(d,4H,Ph—), 6.7 ppm(s,4H,—CH=CH—), 4.0~4.3 ppm(m,8H,O—CH, OH, O—CH$_2$—), 3.5 ppm(t,4H,N—CH$_2$—), 2.3 ppm[t,4H,—(C=O)—CH$_2$—], 1.6~1.7 ppm (m,12H,—CH$_2$—), 1.3 ppm(m,6H,—CH$_3$)

$^{13}$C NMR(100 MHz,CDCl$_3$): 173 ppm[—(C=O)—O], 171 ppm[N—(C=O)], 134 ppm(—CH=CH—), 156 ppm, 143 ppm, 128 ppm, 114 ppm(Ph), 72.8 ppm(C—OH), 68.7 ppm, 68.4 ppm, 65.3 ppm(—O—CH$_2$—), 37.5 ppm(N—CH$_2$—), 33.5 ppm[—CH$_2$—(C=O)], 33.8 ppm, 28.1 ppm, 26.1 ppm, 24.3 ppm (—CH$_2$—), 31.0 ppm(—CH$_3$)

Elemental analysis (CHN): Calcd. C,63.8%; H,6.27%; N,3.81% Found C,62.1%; H,6.01%; N,3.52%.

Molecular weight distribution by GPC: Mn: 1,400 Mw: 1,500

The properties of maleimide derivative (H) were as follows;

IR: 1733 cm$^{-1}$, 1706 cm$^{-1}$(C=O), 830 cm$^{-1}$, 696 cm-1 (C=C)

$^1$H NMR(300 MHz,CDCl$_3$): 6.7 ppm(s,4H,—CH=CH—), 4.1 ppm[t,4H,—(C=O)—O—CH$_2$—], 3.5 ppm(t,4H,N—CH$_2$—), 3.4~3.5 ppm(m,—O—CH$_2$—), 2.3 ppm[t,4H,—(C=O)—CH$_2$—], 1.3 ppm, 1.6~1.7 ppm(m,—CH$_2$—)

$^{13}$C NMR(75 MHz,CDCl$_3$): 173 ppm[—(C=O)—O], 171 ppm[N—(C=O)], 134 ppm(—CH=CH—), 64.1 ppm, 70.1~70.7 ppm(—O—CH$_2$—), 37.6 ppm(N—CH$_2$—), 34.0 ppm[—CH$_2$—(C=O)], 24.4~28.2 ppm(—CH$_2$—)

Elemental analysis (CHN): Calcd. C,57.9%; H,7.83%; N,4.61% Found C,59.3%; H,7.50%; N,3.90%.

Molecular weight distribution by GPC: Mn: 1,000 Mw: 1,100

Manufacturing Example 13

6 g—pale yellow maleimide derivative (H) represented by formula (10)

Manufacturing Example 14

6 g—pale yellow maleimide derivative (I) represented by formula (11)

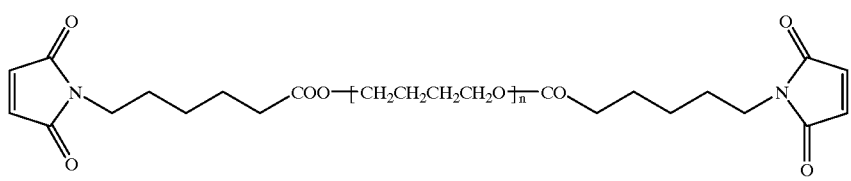

(10)

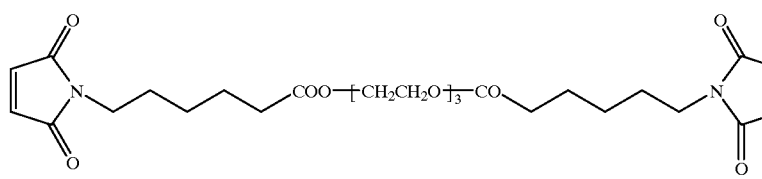

(11)

was obtained in the same manner as Manufacturing Example 6, except that 5 g of polytetramethylene glycol having a MW of 250 (marketed by BASF Japan; trade name: PolyTHF250; Mn: 440, Mw: 470) was used instead of 20 g of polytetramethylene glycol having a MW of 1,000.

was obtained in the same manner as Manufacturing Example 6, except that 3.0 g of triethylene glycol (marketed by Kanto Chemical Co., Ltd.; Mn: 158, Mw: 161) was used instead of 20 g of polytetramethylene glycol having a MW of 1,000.

The properties of maleimide derivative (I) were as follows;

IR: 1735 cm$^{-1}$, 1712 cm$^{-1}$(C=O), 829 cm$^{-1}$, 696 cm$^{-1}$ (C=C)

$^1$H NMR(300 MHz,CDCl$_3$): 6.7 ppm(s,4H,—CH=CH—), 4.2 ppm[t,4H,—(C=O)—O—CH$_2$—], 3.6 ppm(m,8H, —O—CH$_2$—), 3.5 ppm(t,4H,N—CH$_2$—), 2.3 ppm[t,4H,—(C=O)—CH$_2$—], 1.3 ppm, 1.6~1.7 ppm(m,—CH$_2$—)

$^{13}$C NMR(75 MHz,CDCl$_3$): 173 ppm[—(C=O)—O], 171 ppm[N—(C=O)], 134 ppm(—CH=CH—), 63.4 ppm, 69.1~70.8 ppm(—O—CH$_2$—), 37.5 ppm(N—CH$_2$—), 33.8 ppm[—CH$_2$—(C=O)], 24.2 ppm, 26.1 ppm, 28.1 ppm(—CH$_2$—)

Elemental analysis (CHN): Calcd. C,58.2%; H,6.72%; N,5.22% Found C,58.0%; H,6.58%; N,5.28%.

Molecular weight distribution by GPC: Mn: 485 Mw: 488

Manufacturing Example 15

12 g—pale yellow maleimide derivative (J) represented by formula (12)

The properties of maleimide derivative (J) were as follows;

IR: 1732 cm$^{-1}$, 1707 cm$^{-1}$, (C=O), 829 cm$^{-1}$, 696 cm$^{-1}$, (C=C)

$^1$H NMR(300 MHz, CDCl$_3$): 6.7 ppm(s,4H,—CH=CH—), 4.2 ppm[m,4H, —(C=O)—O—CH$_2$—], 3.6~3.8 ppm(m,—O—CH$_2$—,—O—CH—), 3.5 ppm(t,4H, N—CH$_2$—), 2.3 ppm[t,4H,—(C=O)—CH$_2$], 1.1~2.0 ppm (m,—CH$_2$—,—CH—), 0.7 ppm(m,6H,—CH$_3$)

$^{13}$C NMR(75 MHz, CDCl$_3$): 173 ppm[—(C=O)—O], 171 ppm[N—(C=O)], 134 ppm(—CH=CH—), 63.3–73.7 ppm(—O—CH$_2$—,—O—CH—), 37.6 ppm(N—CH$_2$—), 24.0–43.0 ppm[—CH$_2$—,—CH—,—CH$_2$—(C=O)—, 20.3~20.5 ppm(—CH$_3$)

Elemental analysis (CHN): Calcd. C,65.5%; H,8.12%; N,3.92% Found C,64.0%; H,8.40%; N,2.70%.

Molecular weight distribution by GPC: Mn: 1,100 Mw: 1,200

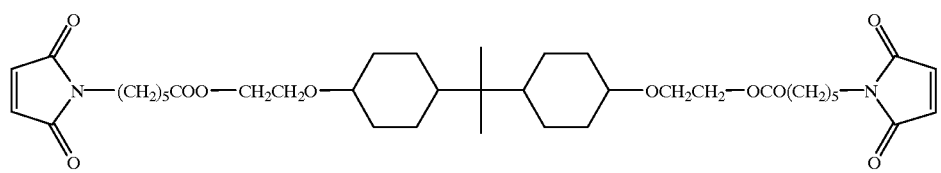

(12)

was obtained in the same manner as Manufacturing Example 6, except that 6.5 g of hydrogenated bisphenol A modified by 2 mole of ethylene oxide (marketed by New Japan Chemical Co., Ltd.; trade name: Rikaresin HEO-20; Mn: 570, Mw: 660) was used instead of 20 g of polytetramethylene glycol having a MW of 1,000.

Manufacturing Example 16

9.5 g—pale yellow maleimide derivative (K) represented by formula (13)

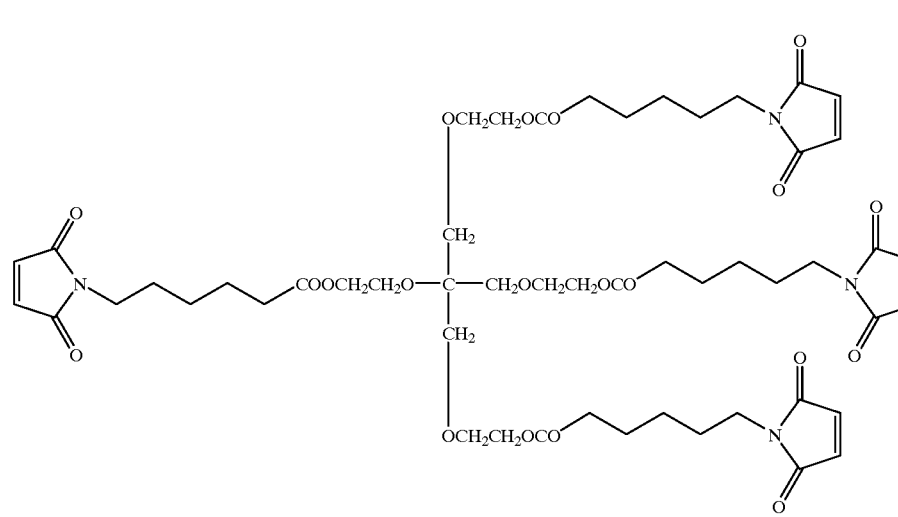

(13)

was obtained in the same manner as Manufacturing Example 6, except that 3.1 g of pentaerythritol modified by 4 mole of ethylene oxide (marketed by Nippon Emulsifying Agent Co., Ltd.; trade name: PNT-40; Mn: 490, Mw: 530) was used instead of 20 g of polytetramethylene glycol having a MW of 1,000.

The properties of maleimide derivative (K) were as follows;

IR: 1732 cm$^{-1}$, 1706 cm$^{-1}$(C=O), 830 cm$^{-1}$, 696 cm$^{-1}$ (C=C)

$^1$H NMR(300 MHz,CDCl$_3$): 6.7 ppm(s,8H,—CH=CH—), 4.1 ppm[m,8H,—(C=O)—O—CH$_2$—], 3.4–3.8 ppm(m,N—CH$_2$—,—O—CH$_2$—), 2.3 ppm[m, 8H,—(C=O)—CH$_2$—], 1.3~1.7 ppm(m,—CH$_2$—)

$^{13}$C NMR(75 MHz, CDCl$_3$): 173 ppm[—(C=O)—O], 171 ppm[N—(C=O)], 134 ppm(—CH=CH—), 63.3~70.9 ppm(—O—CH$_2$—), 37.5 ppm(N—CH$_2$—), 33.8 ppm[—CH$_2$—(C=O)], 24.2–28.1 ppm(—H$_2$—)

Elemental analysis (CHN): Calcd. C,58.7%; H,6.64%; N,5.17% Found C,57.4%; H,6.60%; N,4.60%.

Molecular weight distribution by GPC: Mn: 1,400 Mw: 1,500

Manufacturing Example 17

19 g—pale yellow maleimide derivative (L) represented by formula (14)

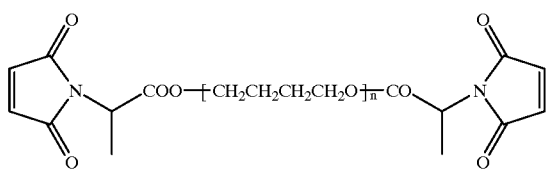

(14)

was obtained in the same manner as Manufacturing Example 6, except that 7.0 g of 2-maleimido-2-methyl acetic acid and 13 g of polytetramethylene glycol having a MW of 650 (marketed by Hodogaya Chemical Co., Ltd.; trade name: PTG650SN; Mn: 1,200, Mw: 1,600) was used instead of 9.8 g of maleimidocaproic acid and 20 g of polytetramethylene glycol having a MW of 1,000 respectively.

The properties of maleimide derivative (L) were as follows;

IR: 1745 cm$^{-1}$, 1718 cm$^{-1}$(C=O), 831 cm$^{-1}$, 697 cm$^{-1}$ (C=C)

$^1$H NMR(300 MHz,CDCl$_3$): 6.7 ppm(s,4H,—CH=CH—), 4.8 ppm(q,2H,N—CH$_2$—) 4.2 ppm[t,4H,—(C=O)—O—CH$_2$—], 3.4~3.5 ppm(m,—O—CH$_2$—), 2.3 ppm[t,4H,—(C=O)—CH$_2$—], 1.6~1.7 ppm(m,—CH$_2$—,—CH$_3$)

$^{13}$C NMR(75 MHz, CDCl$_3$): 171 ppm[N—(C=O)], 169 ppm[—(C=O)—O], 134 ppm(—CH=CH—), 65.7 ppm, 70.0~70.8 ppm(—O—CH$_2$—), 47.5 ppm(N—CH$_2$—), 25.3–26.9 ppm(—CH$_2$—) 15.1 ppm(—CH$_3$)

Elemental analysis (CHN): Calcd. C,62.0%; H,8.45%; N,2.94% Found C,59.9%; H,9.00%; N,1.90%.

Molecular weight distribution by GPC: Mn: 2,100 Mw: 2,500

Manufacturing Example 18

18 g—pale yellow maleimide derivative (M) represented by formula (15)

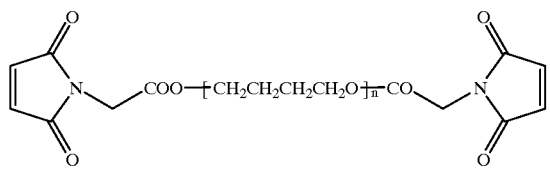

(15)

was obtained in the same manner as Manufacturing Example 6, except that 6.8 g of maleimidoacetic acid synthesized in Manufacturing Example 5 and 13 g of polytetramethylene glycol having a MW of 650 (marketed by Hodogaya Chemical Co., Ltd.; trade name: PTG650SN; Mn: 1,200, Mw: 1,600) was used instead of 9.8 g of maleimidocaproic acid and 20 g of polytetramethylene glycol having a MW of 1,000, respectively.

The properties of maleimide derivative (M) were as follows;

IR: 1750 cm$^{-1}$, 1719 cm$^{-1}$(C=O), 831 cm$^{-1}$, 698 cm$^{-1}$ (C=C)

$^1$H NMR(300 MHz,CDCl$_3$): 6.8 ppm(s,4H,—CH=CH—), 4.3 ppm[s,4H,N—CH$_2$—(C=O)—], 4.2 ppm [t,4H,—(C=O)—O—CH$_2$—], 3.4 ppm(m,—O—CH$_2$—), 1.6~1.7 ppm(m,—CH$_2$—)

$^{13}$C NMR(75 MHz, CDCl$_3$): 170 ppm[N—(C=O)], 167 ppm[—(C=O)—O], 134 ppm(CH=CH—), 65.7 ppm, 70.0~70.7 ppm(—O—CH$_2$—), 38.6 ppm(N—CH$_2$—) 25.4–26.5 ppm(—CH$_2$—)

Elemental analysis (CHN): Calcd. C,61.3%; H,8.27%; N,3.03% Found C,58.3%; H,7.50%; N,1.80%.

Molecular weight distribution by GPC: Mn: 2,100 Mw: 2,500

Manufacturing Example 19

15 g—pale yellow maleimide derivative (N) represented by formula (16)

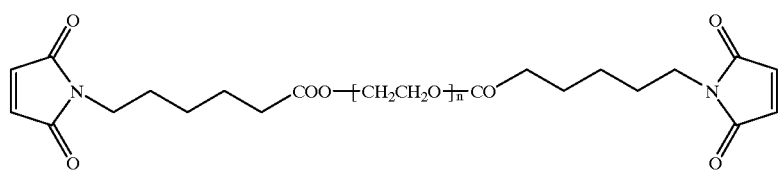

(16)

was obtained in the same manner as Manufacturing Example 6, except that 12 g of polyethylene glycol having a MW of 600 (marketed by Kanto Chemical Co., Ltd.; Mn: 655, Mw: 686) was used instead of 20 g of polytetramethylene glycol having a MW of 1,000.

The properties of maleimide derivative (N) were as follows;

IR: 1735 $cm^{-1}$, 1712 $cm^{-1}$(C=O), 829 $cm^{-1}$, 696 $cm^{-1}$ (C=C)

$^1$H-NMR(400 MHz,CDCl$_3$): 6.7 ppm(s,4H,—CH=CH—), 4.2 ppm[t,4H,—(C=O)—O—CH$_2$—], 3.6 ppm(m,—O—CH$_2$—), 3.5 ppm(t,4H,N—CH$_2$—), 2.3 ppm [t,4H,—(C=O)—CH$_2$—], 1.6 ppm(m,8H,—CH$_2$—) 1.4 ppm(m,4H,—CH$_2$—)

$^{13}$C-NMR(100 MHz, CDCl$_3$): 173 ppm[—(C=O)—O], 171 ppm[N—(C=O)], 134 ppm(—CH=CH—), 63.4 ppm, 69.1 ppm, 70.5 ppm(—O—CH$_2$—), 37.6 ppm(N—CH$_2$—), 33.9 ppm[—CH$_2$—(C=O)], 24.3 ppm, 26.2 ppm, 28.2 ppm(—CH$_2$—)

Elemental analysis (CHN): Calcd. C,55.6%; H,7.67%; N,2.8% Found C,54.9%; H,7.88%; N,2.6%.

Molecular weight distribution by GPC: Mn: 1,060 Mw: 1,080

Manufacturing Example 20

23.8 g of hydrogenated bisphenol A modified by epichlorohydrin (marketed by New Japan Chemical Co., Ltd.; trade name: HBE-100; Mn: 360, Mw: 390), 0.10 g of 2,6-tert-butyl p-cresol, and 0.02 g of 2-methylimidazole were added in a 100 ml three-neck-flask equipped with a reflux condenser and a stirrer, and 29.5 g of maleimidocaproic acid was added dropwise for 3 hours while stirring at 90° C under nitrogen. After 4 hours, the reaction was terminated when the acid value of the reactant was approximately 0. Thereby, 50 g—pale yellow maleimide derivative (O) represented by formula (17)

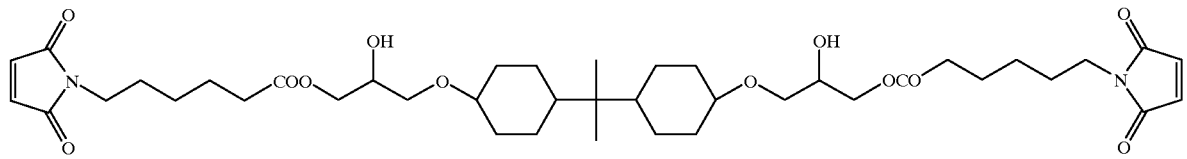

(17)

was obtained.

The properties of maleimide derivative (O) were as follows;

IR: 3460 $cm^{-1}$(OH), 1705 $cm^{-1}$(C=O), 834 $cm^{-1}$, 696 $cm^{-1}$(C=C)

$^1$H-NMR(300 MHz,CDCl$_3$): 6.7 ppm(s,4H,—CH=CH), 5.3 ppm[s,2H,—(C=O)O—CH—], 4.2 ppm(m,2H, O—CH—) 4.0 ppm(s,2H,—OH), 3.5~3.8 ppm(m, O—CH$_2$—,N—CH$_2$—), 2.3 ppm[t,4H,—(C=O)—CH$_2$—], 1.6~1.7 ppm(m,—CH$_2$—,—CH—), 1.2~1.3 ppm (m,—CH$_2$—), 0.7 ppm(s,6H,—CH$_3$)

$^{13}$C-NMR(100 MHz, CDCl$_3$): 173 ppm[—(C=O)—O], 171 ppm[N—(C=O)], 134 ppm(—CH=CH—), 79.2 ppm [—(C=O)O—CH—], 65.6 ppm, 68.8 ppm, 69.0 ppm(—O—CH$_2$—,—O—CH—), 37.6 ppm(N—CH$_2$—), 33.9 ppm[—CH$_2$—(C=O)], 32.6~24.4 ppm(—CH$_2$—,—CH—), 20.6 ppm(—CH$_3$)

Elemental analysis (CHN): Calcd. C,63.8%; H,6.27%; N,3.81% Found C,65.3%; H,6.58%; N,3.34%.

Molecular weight distribution by GPC: Mn: 780 Mw: 850

Manufacturing Example 21

51.6 g of 4-hydroxybutyl vinyl ether, 0.03 g of dibutyltin dilaurate, 0.12 g of 2,6-tert-butyl p-cresol, and 0.018 g of p-methoxyphenol were added in a 300 ml four-neck-flask equipped with a dropping funnel, a reflux condenser, and a stirrer. And the 48.4 g of isophoronediisocyanate was added dropwise from the dropping funnel at 50° C. for 2 hours, stirring during the reaction, followed by the raise of reaction temperature to 80° C. After 4 hours, the reaction was terminated when the absorption at 2,250 $cm^{-1}$ of IR derived from isocyanate unit had disappeared. Thereby, 100 g of clear sticky solution of vinyl ether (a) represented by formula (18)

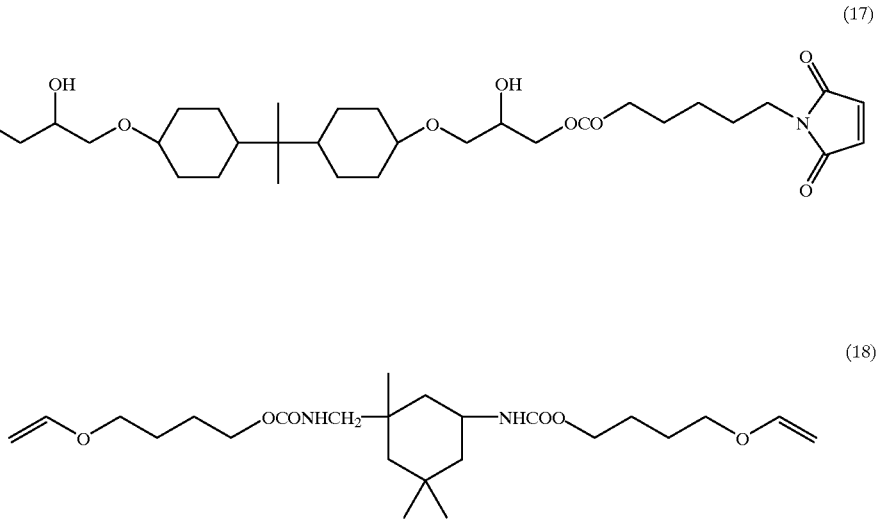

(18)

was obtained.

Manufacturing Example 22

58.5 g of 4-hydroxybutyl vinyl ether, 0.03 g of dibutyltin dilaurate, 0.12 g of 2,6-tert-butyl p-cresol, and 0.018 g of p-methoxyphenol were added in a 300 ml four-neck-flask equipped with a dropping funnel, a reflux condenser, and a stirrer. And the 41.5 g of hexamethylene diisocyanate trimer (marketed by Sumitomo Baieru Urethane Co., Ltd.; trade name: Sumidur N-3500; Mn: 2,700; Mw: 4,700) was added dropwise from the dropping funnel at 60° C. for 2 hours, stirring during the reaction, followed by the raise of reaction temperature to 80° C. After 6 hours, the reaction was terminated when the absorption at 2,250 cm$^{-1}$ of IR derived from isocyanate unit had disappeared. Thereby, 100 g of clear sticky solution of vinyl ether (b) represented by formula (19)

derivatives (A) to (M) are evaluated as follows. The results are summarized in Table 1.

(1) UV Curing Properties

The curable compounds were coated on glass plates to form films with the thickness of 50 μm. UV irradiation was conducted by a conveyor-type medium-pressure-mercury-lamp (120 W/cm; marketed by Eye Graphics Co., Ltd.) in air, in the conditions that the lamp height was 15 cm and the (19)

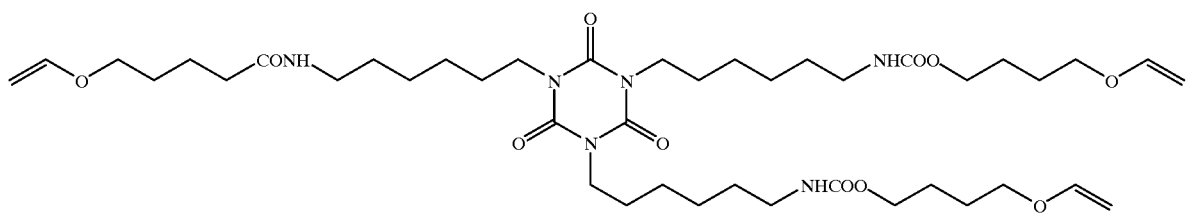

was obtained.

Manufacturing Example 23

34.8 g of tetramethylene glycol having a MW of 1,000 (marketed by Hodogaya Chemical Co., Ltd.; trade name: PTGL1000; Mn: 2,100, Mw: 5,000), 0.03 g of dibutyltin dilaurate, 0.4 g of 2,6-tert-butyl p-cresol, 0.1 g of p-methoxyphenol, and 50 g of ethyl acetate were added in a 300 ml four-neck-flask equipped with a dropping funnel, a reflux condenser, and a stirrer. And the 15.2 g of isophoronediisocyanate was added dropwise from the dropping funnel at 50° C. for 3 hours, stirring during the reaction, followed by the raise of reaction temperature to 60° C. After 2 hours, when the NCO value reached the theoretical value (5.82%) the reaction temperature was raised to 75° C., and then 5.46 g of 4-hydroxybutyl vinyl ether was added dropwise for 3 hours, stirring during the reaction. After 21 hours, the reaction was terminated when the absorption at 2,250 cm$^{-1}$ of IR derived from isocyanate unit had disappeared. Thereby, 55.5 g of clear sticky solution of vinyl ether (c) represented by formula (20)

conveyor speed was 20 m/min. UV exposure dose for 1 pass measured by Industrial UV checker (marketed by Topcon Co., Ltd.; trade name: UVR-T37) was 92 mJ/cm$^2$. The number of irradiation times for curing the film to be tack-free was evaluated.

(2) Gel-fraction

The cured film of the curing compound was prepared by exposing the UV irradiation apparatus applying the above curing conditions three times. The cured film (weight: $W_1$) peeled off from a glass plate was refluxed in methyl ethyl ketone at 80° C., for 3 hours, and then dried at 100° C., for 1 hour. The weight of the residue film (weight: $W_2$) thereof was measured. Gel-fraction was calculated according to the following equation.

Gel-fraction (%)=100×($W_1$−$W_2$)/$W_1$ (3) Surface Hardness of Coating

The cured film of the curing compound was prepared by exposing the UV irradiation apparatus applying the above curing conditions three times. The pencil hardness of the cured film was measured in accordance with JIS K-5400 as surface hardness of the coating.

(20)

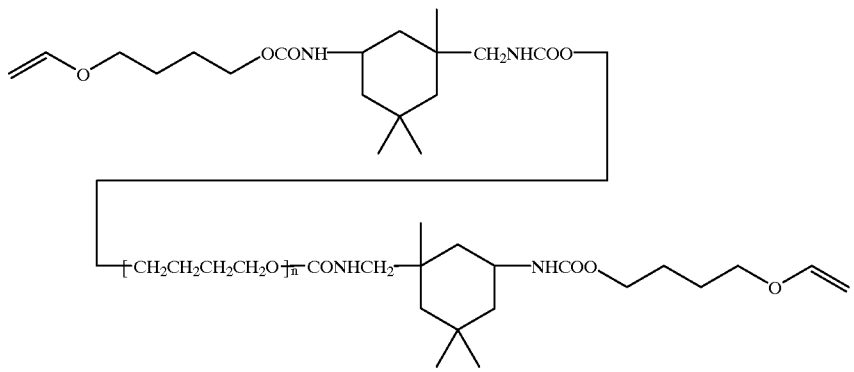

was obtained.

Examples 1 to 13

UV curing properties of maleimide derivatives (A) to (M), and gel-fraction and pencil hardness of the cured maleimide

Comparative Example 1

N-tert-butylmaleimide (disclosed in *Synthetic Communications*, vol. 20, pp. 1607–1610, 1990) was evaluated in the same manner as the Examples described above.

However, the compound maintained the liquid state even after the 10 times of UV irradiation.

Comparative Example 2

N,N'-4,9-dioxa-1,12-bismaleimidododecane (disclosed in *Polymer Preprints,* vol. 37, pp. 348–349, 1996) was evaluated in the same manner as the Examples. The compound was solid at room temperature, and was not coated flatly on a glass plate. Therefore, the compound was dissolved in chloroform, and was coated on a glass plate. After that, the yellow-white solid film was obtained by drying the film. The obtained solid film was evaluated in the same manner as the Examples. However, the film was not cured with the 0% of gel-fraction even after the 10 times of UV irradiation.

Comparative Example 3

N-ethylmaleimide (marketed by Kanto Chemical Co., Ltd.; disclosed in *Polymer Letters,* vol. 6, pp. 883–888, 1968) was evaluated in the same manner as the Examples. The compound was solid at room temperature, and was not coated flatly on a glass plate. Therefore, the compound was dissolved in methanol, and coated on a glass plate. After that, the solid film was obtained by drying the film. The obtained solid film was evaluated in the same manner as the Examples. However, the film was not cured with the 0% of gel-fraction even after the 10 times of UV irradiation.

Comparative Example 4

8.5 g—pale yellow maleimide derivative (P) represented by formula (21)

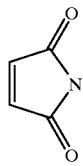

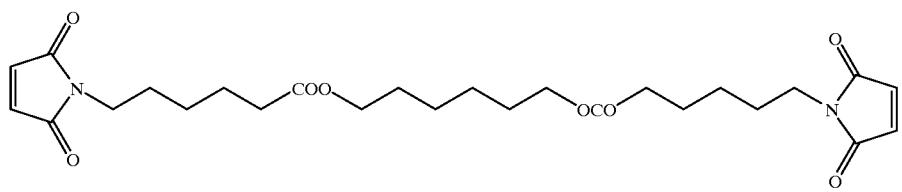

(21)

was obtained in the same manner as Manufacturing Example 6, except that 2.24 g of 1,6-hexanediol was used instead of 20 g of polytetramethylene glycol having a MW of 1,000.

The compound was solid at room temperature, and was not coated flatly on a glass plate. Therefore, the compound was dissolved in chloroform, and was coated on a glass plate. After that, the yellow-white solid film was obtained by drying the film. The obtained solid film was evaluated in the same manner as the Examples. However, the compound was not cured with the 0% of gel-fraction even after the 10 times of UV irradiation.

Comparative Example 5

8.0 g—pale yellow maleimide derivative (Q) represented by formula (22)

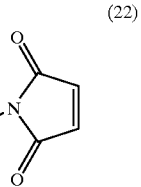

(22)

was obtained in the same manner as Manufacturing Example 6, except that 2.1 g of diethylene glycol was used instead of 20 g of polytetramethylene glycol having a MW of 1,000.

The compound was evaluated in the same manner as the Examples. The compound was not cured completely and a part of inside of the film kept the liquid state even after the 6 times of UV irradiation. The gel-fraction was 36% after the 3 times of UV irradiation.

TABLE 1

| | Maleimide derivative | UV curing property (times) | Gel-fraction (%) | Pencil hardness |
|---|---|---|---|---|
| Example 1 | (A) | 1 | 99.8 | 4B |
| Example 2 | (B) | 4 | 68.5 | 4B> |
| Example 3 | (C) | 1 | 97.5 | 2B |
| Example 4 | (D) | 1 | 99.6 | 4B> |
| Example 5 | (E) | 1 | 99.4 | 4B |

TABLE 1-continued

| | Maleimide derivative | UV curing property (times) | Gel-fraction (%) | Pencil hardness |
|---|---|---|---|---|
| Example 6 | (F) | 2 | 70.2 | 4B |
| Example 7 | (G) | 5 | 54.2 | 4B> |
| Example 8 | (H) | 1 | 96.8 | 4B |
| Example 9 | (I) | 2 | 90.2 | 4B |
| Example 10 | (J) | 2 | 72.0 | 4B |
| Example 11 | (K) | 1 | 93.2 | 2B |
| Example 12 | (L) | 1 | 97.9 | 4B |
| Example 13 | (M) | 1 | 98.2 | 4B |

TABLE 1-continued

|  | Maleimide derivative | UV curing property (times) | Gel-fraction (%) | Pencil hardness |
|---|---|---|---|---|
| Comparative Example 1 | NBMI | No cured | 0 | — |
| Comparative Example 2 | BMID | No cured | 0 | — |
| Comparative Example 3 | EMI | No cured | 0 | — |
| Comparative Example 4 | (P) | No cured | 0 | — |
| Comparative Example 5 | (Q) | 7 | 36.4 | — |

In Table 1, "-" indicates that the evolution of pencil hardness of the film was impossible because of no cured film or partially cured film.

Explanation of the compounds in Table 1:
- (A) to (M): The maleimide derivatives represented by formula (1) synthesized in Manufacturing Examples 6 to 18.
- (P) and (Q): Maleimide derivatives synthesized in Comparative Examples 4 and 5.
- NBMI: N-butylmaleimide (marketed by Aldrich Chemical Co., Inc.)
- BMID: N,N'-4,9-dioxa-1,12-bismaleimidododecane
- EMI: N-ethylmaleimide (marketed by Kanto Chemical Co., Ltd.)

Example 14

The maleimide derivative (B) represented by formula (4) synthesized in Manufacturing Example 7 was admixed with the maleimide derivative (F) represented by formula (8) synthesized in Manufacturing Example 11 in a 3:7-weight ratio to form the active energy ray curable composition (A-1).

UV curing property of the composition (A-1), and gel-fraction and pencil hardness of the cured composition (A-1) were evaluated in the same manner as Example 1. The results are summarized in Table 2.

Example 15

The maleimide derivative (G) represented by formula (9) synthesized in Manufacturing Example 12 was admixed with the maleimide derivative (L) represented by formula (14) synthesized in Manufacturing Example 17 in a 1:1-weight ratio to form the active energy ray curable composition (A-2).

UV curing property of the composition (A-2), and gel-fraction and pencil hardness of the cured composition (A-2) were evaluated in the same manner as Example 1. The results are summarized in Table 2.

Example 16

The maleimide derivative (K) represented by formula (13) synthesized in Manufacturing Example 16 was admixed with the maleimide derivative (M) represented by formula (15) synthesized in Manufacturing Example 18 in a 7:3-weight ratio to form the active energy ray curable composition (A-3).

UV curing property of the composition (A-3), and gel-fraction and pencil hardness of the cured composition (A-3) were evaluated in the same manner as Example 1. The results are summarized in Table 2.

Example 17

The maleimide derivative (C) represented by formula (5) synthesized in Manufacturing Example 8 was admixed with N,N'-1,12-dodecamethylenebismaleimide (disclosed in Polymer Preprints, vol. 37, pp. 348–349, 1996) in a 2:1-weight ratio to form the active energy ray curable composition (A-4).

UV curing property of the composition (A-4), and gel-fraction and pencil hardness of the cured composition (A-4) were evaluated in the same manner as Example 1. The results are summarized in Table 2.

Example 18

The maleimide derivative (H) represented by formula (10) synthesized in Manufacturing Example 13 was admixed with maleimide derivative (J) represented by formula (12) synthesized in Manufacturing Example 15 and N-laurylmaleimide (marketed by Daihachi Chemical Co., Ltd.; trade name: LMI) in a 4:4:2-weight ratio to form the active .energy ray curable composition (A-5).

UV curing property of the composition (A-5), and gel-fraction and pencil hardness of the cured composition (A-5) were evaluated in the same manner as Example 1. The results are summarized in Table 2.

Example 19

The maleimide derivative (M) represented by formula (15) synthesized in Manufacturing Example 18 was admixed with N-butylmaleimide (marketed by Ardrich Chemical Co., Inc.; disclosed in JP-A-61-250064 and JP-A-62-64813) in a 2:1-weight ratio to form the active energy ray curable composition (A-6).

UV curing property of the composition (A-6), and gel-fraction and pencil hardness of the cured composition (A-6) were evaluated in the same manner as Example 1. The results are summarized in Table 2.

Example 20

The maleimide derivative (H) represented by formula (10) synthesized in Manufacturing Example 13 was admixed with N-(isobutoxymethyl)acrylamide (marketed by Kasano Kousan Co., Ltd.; trade name: Wasmer IBM) in a 2:1-weight ratio to form the active energy ray curable composition (A-7).

UV curing property of the composition (A-7), and gel-fraction and pencil hardness of the cured composition (A-7) were evaluated in the same manner as Example 1. The results are summarized in Table 2.

Example 21

The maleimide derivative (I) represented by formula (11) synthesized in Manufacturing Example 14 was admixed with N-(isobutoxymethyl)acrylamide (marketed by Kasano Kousan Co., Ltd.; trade name: Wasmer IBM) in a 2:1-weight ratio to form the active energy ray curable composition (A-8).

UV curing property of the composition (A-8), and gel-fraction and pencil hardness of the cured composition (A-8) were evaluated in the same manner as Example 1. The results are summarized in Table 2.

Example 22

The maleimide derivative (K) represented by formula (13) synthesized in Manufacturing Example 16 was admixed with the maleimide derivative (B) represented by formula (4) synthesized in Manufacturing Example 7 and dioctylmaleate (marketed by Kurogane Chemical Co., Ltd.; trade name: DOM) in a 2:2:1-weight ratio to form the active energy ray curable composition (A-9).

UV curing property of the composition (A-9), and gel-fraction and pencil hardness of the cured composition (A-9) were evaluated in the same manner as Example 1. The results are summarized in Table 2.

Example 23

The maleimide derivative (H) represented by formula (10) synthesized in Manufacturing Example 13 was admixed with the maleimide derivative (B) represented by formula (4) synthesized in Manufacturing Example 7 and dioctylfumarate (marketed by Kurogane Chemical Co., Ltd.; trade name: DOF) in a 2:2:1-weight ratio to form the active energy ray curable composition (A-10).

UV curing properties of the composition (A-10), and gel-fraction and pencil hardness of the cured composition (A-10) were evaluated in the same manner as Example 1.

Comparative Example 6

1,1'-(methylene-di-4,1-phenylene)bismaleimide (marketed by Ardrich Chemical Co., Inc.) was admixed with dioctylfumarate (marketed by Kurogane Chemical Co., Ltd.; trade name: DOF) in a 3:7-weight ratio. However, 1,1'-(methylene-di-4,1-phenylene) bismaleimide was not dissolved in dioctylfumalate. Therefore the dispersion of the maleimide in DOF was coated on a glass plate, and cured properties were evaluated in the same manner as the Example 1. However, the composition after UV irradiation maintained the dispersed state with the 0% of gel-fraction even after the 10 times of UV irradiation.

Comparative Example 7

N,N'-4,9-dioxa-1,12-bismaleimidododecane (disclosed in *Polymer Preprints*, vol. 37, pp. 348–349, 1996) was admixed with N-butylmaleimide (marketed by Ardrich Chemical Co., Inc.; disclosed in JP-A-61-250064 and JP-A-62-64813) in a 2:1-weight ratio to form the active energy ray curable composition (B-1).

The composition (B-1) was evaluated in the same manner as the Example 1. However, the composition was not cured completely and a part of inside of the film kept the liquid state even after the 5 times of UV irradiation. The gel-fraction was 42% after the 3 times of UV irradiation.

Comparative Example 8

The maleimide derivative (P) represented by formula (21) synthesized in Comparative Example 4 was admixed with N-(isobutoxymethyl)acrylamide (marketed by Kasano Kosan Co., Ltd.; trade name: Wasmer IBM) in a 2:1-weight ratio to form the active energy ray curable composition (B-2).

The composition (B-2) was evaluated in the same manner as the Example 1. However, the composition was not cured completely and a part of inside of the film kept the liquid state even after the 5 times of UV irradiation. The gel-fraction was 23.7% after the 3 times of UV irradiation.

Comparative Example 9

The maleimide derivative (Q) represented by formula (22) synthesized in Comparative Example 5 was admixed with N-(isobutoxymethyl)acrylamide (marketed by Kasano Kosan Co., Ltd.; trade name: Wasmer IBM) in a 2:1-weight ratio to form the active energy ray curable composition (B-3).

The composition (B-3) was evaluated in the same manner as the Example 1. However, the composition was not cured completely and a part of inside of the film kept the liquid state even after the 5 times of UV irradiation. The gel-fraction was 31.1% after the 3 times of UV irradiation.

TABLE 2

| | Maleimide derivative represented by formula (1) | Other curable compound | UV curing property (times) | Gel-fraction (%) | Pencil hardness |
|---|---|---|---|---|---|
| Example 14 | (B) + (F) | — | 2 | 92.1 | 4B |
| Example 15 | (G) + (L) | — | 2 | 94.5 | 2B |
| Example 16 | (K) + (M) | — | 1 | 98.2 | 2B |
| Example 17 | (C) | DMBM | 1 | 91.2 | 4B |
| Example 18 | (H) + (J) | LMI | 2 | 82.8 | 4B |
| Example 19 | (M) | NBMI | 2 | 85.5 | 4B |
| Example 20 | (H) | IBM | 2 | 96.4 | 3B |
| Example 21 | (I) | IBM | 3 | 56.6 | 4B |
| Example 22 | (B) + (K) | DOM | 3 | 67.2 | 4B> |
| Example 23 | (B) + (H) | DOF | 3 | 67.9 | 4B> |

Explanation of the compounds in Table 2:

(B) to (M): The maleimide derivatives represented by formula (1) synthesized in Manufacturing Examples 7 to 18.

DMBM: N,N'-1,12-dodecamethylenebismaleimide

LMI: N-laurylmaleimide (marketed by Daihachi Chemical Co., Ltd.; trade name: LMI)

NBMI: N-butylmaleimide (marketed by Ardrich Chemical Co., Inc.)

IBM: N-(isobutoxymethyl)acrylamide (marketed by Kasano Kousan Co., Ltd.; trade name: Wasmer IBM)

DOM: dioctylmaleate (marketed by Kurogane Chemical Co., Ltd.; trade name: DOM)

DOF: dioctylfumarate (marketed by Kurogane Chemical Co., Ltd.; trade name: DOF)

TABLE 3

| | Comparative compound | UV curing property (times) | Gel-fraction (%) | Pencil hardness |
|---|---|---|---|---|
| Comparative Example 6 | MDOBM + DOF | No cured | 0 | — |
| Comparative Example 7 | 4,9DOMI + NBMI | 6 | 42.0 | 4B> |
| Comparative Example 8 | (P) + IBM | 8 | 23.7 | 4B> |
| Comparative Example 9 | (Q) + IDM | 6 | 31.1 | 4B> |

In Table 3, "-" indicates that the evolution of pencil hardness of the film was impossible because of no cured film or partially cured film.

Explanation of the compounds in Table 3:

(P) and (Q): The maleimide derivatives synthesized in Comparative Examples 4 and 5.

MDOBM: 1,1'-methylene-di-4,1-phenylene) bismaleimide (marketed by Ardrich Chemical Co., Inc.)

DOF: dioctylfumarate (marketed by Kurogane Chemical Co., Ltd.; trade name: DOF)

4,9DOMI: N,N'-4,9-dioxa-1,12-bismaleimidedodecane

NBMI: N-butylmaleimide (marketed by Ardrich Chemical Co., Inc.)

IBM: N-(isobutoxymethyl)acrylamide (marketed by Kasano Kousan Co., Ltd.; trade name: Wasmer IBM)

It is obvious from Tables 1 to 3 that the active energy ray curable compositions comprising the maleimide derivatives represented by formula (1) of the present invention are easily cured under UV irradiation to form the flat clear coatings in the absence of photo-initiator. In contrast, it is clear that the well-know compounds applied to Comparative Examples 1 to 3, 6, and 7 are not cured under UV irradiation, and not produced the flat coatings.

In spite of the compounds applied to Comparative Example 4 and 5 have the same structure of the compounds represented by formula (1) of the present invention, their reactivity of UV curing are lower than those of the active energy ray curable compositions of the Examples. The reasons are obvious that the linking chains represented by $R_2$ of the compounds used in Comparative Examples 4 and 5 are —$(CH_2)_6$— and —$(CH_2$—$CH_2$—$O$—$CH_2$—$CH_2)$—, respectively, and these linking chains have molecular weight of less than 100. Moreover, UV curing rate of compositions of these compounds in Comparative Examples 8 and 9 are low in comparison with those of the active energy ray curable compositions of the Examples.

In contrast, the compounds applied to Example 9 and 21 show higher reactivities of UV curing and higher gel-fractions of coatings than those of the compounds applied to Comparative Examples 4, 5, 8, and 9. It is clear that the linking chain represented by $R_2$ of the compounds applied to Examples 9 and 21 has a molecular weight of 118, and this is more than 100 because $R_2$ of this linking chain is —$(CH_2$—$CH_2$—$O$—$CH_2$—$CH_2$—$O$—$CH_2$—$CH_2)$—.

In this way, when the molecular weight of the linking chain represented by $R_2$ is 100 or more, the compound having the linking chain had excellent curing properties under irradiation of active energy ray. Thereby, the effectiveness of the compositions of the present invention is clear.

Example 24

The maleimide derivative (A) represented by formula (3) synthesized in Manufacturing Example 6 was admixed with trimethylolpropane triacrylate modified by three equivalent of ethylene oxide (marketed by Nippon Kayaku Co., Ltd.; trade name: KAYARAD-THE330) in a 7:3-weight ratio to form the active energy ray curable composition (A-11).

UV curing property of the composition (A-11), and gel-fraction and pencil hardness of the cured composition (A-11) were evaluated in the same manner as Example 1. The results are summarized in Table 4.

Example 25

The maleimide derivative (A) represented by formula (3) synthesized in Manufacturing Example 6 was admixed with dipentaerythritol hexaacrylate (marketed by Nippon Kayaku Co., Ltd.; trade name: KAYARAD-DPHA) in a 3:7-weight ratio to form the active energy ray curable composition (A-12).

UV curing property of the composition (A-12), and gel-fraction and pencil hardness of the cured composition (A-12) were evaluated in the same manner as Example 1. The results are summarized in Table 4.

Example 26

The active energy ray curable composition (A-13) was prepared in the same manner as Example 24, except that dicyclopentenyl acrylate (marketed by Hitachi Kasei Co., Ltd.; trade name: FA-511A) was used instead of trimethylolpropane triacrylate modified by three equivalent of ethylene oxide.

UV curing property of the composition (A-13), and gel-fraction and pencil hardness of the cured composition (A-13) were evaluated in the same manner as Example 1. The results are summarized in Table 4.

Example 27

The active energy ray curable composition (A-14) was prepared in the same manner as Example 24, except that isobornyl acrylate (marketed by Osaka Organic Chemical Industry Co., Ltd.; trade name: IBXA) was used instead of trimethylolpropane triacrylate modified by three equivalent of ethylene oxide.

UV curing property of the composition (A-14), and gel-fraction and pencil hardness of the cured composition (A-14) were evaluated in the same manner as Example 1. The results are summarized in Table 4.

Example 28

The maleimide derivative (A) represented by formula (3) synthesized in Manufacturing Example 6 was admixed with modified bisphenol A diacrylate (marketed by Dainippon Ink and Chemicals, Inc.; trade name: V-5500) in a 1:1-weight ratio to form the active energy ray curable composition (A-15).

UV curing property of the composition (A-15), and gel-fraction and pencil hardness of the cured composition (A-15) were evaluated in the same manner as Example 1. The results are summarized in Table 4.

Example 29

The active energy ray curable composition (A-16) was prepared in the same manner as Example 28, except that urethane diacrylate (marketed by Dainippon Ink and Chemicals, Inc.; trade name: V-4200) was used instead of modified bisphenol A diacrylate.

UV curing property of the composition (A-16), and gel-fraction and pencil hardness of the cured composition (A-16) were evaluated in the same manner as Example 1. The results are summarized in Table 4.

Example 30

The active energy ray curable composition (A-17) was prepared in the same manner as Example 28, except that polyester acrylate (marketed by Toagosei Co., Ltd.; trade name: M-5600) was used instead of modified bisphenol A diacrylate.

UV curing property of the composition (A-17), and gel-fraction and pencil hardness of the cured composition (A-17) were evaluated in the same manner as Example 1. The a results are summarized in Table 4.

Example 31

The active energy ray curable composition (A-18) was prepared in the same manner as Example 28, except that polyester acrylate (marketed by Toagosei Co., Ltd.; trade name: M-8060) was used instead of modified bisphenol A diacrylate.

UV curing property of the composition (A-18), and gel-fraction and pencil hardness of the cured composition (A-18) were evaluated in the same manner as Example 1. The results are summarized in Table 4.

Example 32

The active energy ray curable composition (A-19) was prepared in the same manner as Example 24, except that trimethylolpropane trimethacrylate (marketed by Dainippon Ink and Chemicals, Inc.; trade name: LUMICURE TMM-300) was used instead of trimethylolpropanetriacrylate modified by three equivalent of ethylene oxide.

UV curing property of the composition (A-19), and gel-fraction and pencil hardness of the cured composition (A-19) were evaluated in the same manner as Example 1. The results are summarized in Table 4.

Example 33

The maleimide derivative (C) represented by formula (5) synthesized in Manufacturing Example 8 was admixed with dipentaerythritol hexaacrylate (marketed by Nippon Kayaku Co., Ltd.; trade name: KAYARAD-DPHA) in a 1:1-weight ratio to form the active energy ray curable composition (A-20).

UV curing property of the composition (A-20), and gel-fraction and pencil hardness of the cured composition (A-20) were evaluated in the same manner as Example 1. The results are summarized in Table 5.

Example 34

The maleimide derivative (C) represented by formula (5) synthesized in Manufacturing Example 8 was admixed with polyethylene glycol 400 diacrylate (marketed by Nippon Kayaku Co., Ltd.; trade name: KAYARAD-PEG400DA) in a 7:3-weight ratio to form the active energy ray curable composition (A-21).

UV curing property of the composition (A-21), and gel-fraction and pencil hardness of the cured composition (A-21) were evaluated in the same manner as Example 1. The results are summarized in Table 5.

Example 35

The active energy ray curable composition (A-22) was prepared in the same manner as Example 33, except that the maleimide derivative (D) synthesized in Manufacturing Example 9 was used instead of the maleimide derivative (C).

UV curing property of the composition (A-22), and gel-fraction and pencil hardness of the cured composition (A-22) were evaluated in the same manner as Example 1. The results are summarized in Table 5.

Example 36

The maleimide derivative (D) represented by formula (6) synthesized in Manufacturing Example 9 was admixed with trimethylolpropane triacrylate (marketed by Nippon Kayaku Co., Ltd.; trade name: KAYARAD-TMPTA) in a 7:3-weight ratio to form the active energy ray curable composition (A-23).

UV curing property of the composition (A-23), and gel-fraction and pencil hardness of the cured composition (A-23) were evaluated in the same manner as Example 1. The results are summarized in Table 5.

Example 37

The active energy ray curable composition (A-24) was prepared in the same manner as Example 33, except that the maleimide derivative (I) synthesized in Manufacturing Example 14 was used instead of the maleimide derivative (C).

UV curing property of the composition (A-23), and gel-fraction and pencil hardness of the cured composition (A-23) were evaluated in the same manner as Example 1. The results are summarized in Table 5.

Example 38

The active energy ray curable composition (A-25) was prepared in the same manner as Example 25, except that the maleimide derivative (N) synthesized in Manufacturing Example 19 was used instead of the maleimide derivative (A).

UV curing property of the composition (A-25), and gel-fraction and pencil hardness of the cured composition (A-25) were evaluated in the same manner as Example 1. The results are summarized in Table 5.

Example 39

The maleimide derivative (N) represented by formula (16) synthesized in Manufacturing Example 19 was admixed with hexanediol diacrylate (marketed by Nippon Kayaku Co., Ltd.; trade name: KS-HDDA) in a 7:3-weight ratio to form the active energy ray curable composition (A-26).

UV curing property of the composition (A-26), and gel-fraction and pencil hardness of the cured composition (A-26) were evaluated in the same manner as Example 1. The results are summarized in Table 5.

Example 40

The active energy ray curable composition (A-27) was prepared in the same manner as Example 25, except that the maleimide derivative (E) synthesized in Manufacturing Example 10 was used instead of the maleimide derivative (A).

UV curing property of the composition (A-27), and gel-fraction and pencil hardness of the cured composition (A-27) were evaluated in the same manner as Example 1. The results are summarized in Table 5.

Example 41

The active energy ray curable composition (A-28) was prepared in the same manner as Example 36, except that the maleimide derivative (E) synthesized in Manufacturing Example 10 was used instead of the maleimide derivative (D).

UV curing property of the composition (A-28), and gel-fraction and pencil hardness of the cured composition (A-28) were evaluated in the same manner as Example 1. The results are summarized in Table 5.

Example 42

The maleimide derivative (G) represented by formula (9) synthesized in Manufacturing Example 12 was admixed with polyethylene glycol 400 diacrylate (marketed by Nippon Kayaku Co., Ltd.; trade name: KAYARAD-PEG400DA) in a 1:1-weight ratio to form the active energy ray curable composition (A-29).

UV curing property of the composition (A-29), and gel-fraction and pencil hardness of the cured composition (A-29) were evaluated in the same manner as Example 1. The results are summarized in Table 5.

Example 43

The active energy ray curable composition (A-30) was prepared in the same manner as Example 42, except that urethane diacrylate (marketed by Dainippon Ink and Chemicals, Inc.; trade name: V-4200) was used instead of polyethylene glycol 400 diacrylate.

UV curing property of the composition (A-30), and gel-fraction and pencil hardness of the cured composition (A-30) were evaluated in the same manner as Example 1. The results are summarized in Table 5.

Comparative Example 10

N-ethylmaleimide (marketed by Kanto Chemical Co., Ltd.; disclosed in *Polymer Letters*, vol. 6, pp. 883–888, 1968) was admixed with dipentaerythritol hexaacrylate (marketed by Nippon Kayaku Co., Ltd.; trade name: KAYARAD-DPHA) in a 3:7-weight ratio. Because N-ethylmaleimide was solid at room temperature and was not dissolved in the acrylate at room temperature, N-ethylmaleimide was dissolved in the acrylate at 60° C. The mixture was coated on a glass plate at the same temperature and evaluated in the same manner as the Example 1. However, the mixture was not cured with the 0% of gel-fraction even after the 10 times of UV irradiation.

Comparative Example 11

N-ethylmaleimide (marketed by Kanto Chemical Co., Ltd.; disclosed in *Polymer Letters*, vol. 6, pp. 883–888, 1968) was admixed with modified bisphenol A diacrylate (marketed by Dainippon Ink and Chemicals, Inc.; trade name: V-5500) in a 3:7-weight ratio. Because N-ethylmaleimide was solid at room temperature and was not dissolve in the acrylate at room temperature, N-ethylmaleimide was dissolved in the acrylate at 60° C. The composition was coated on a glass plate at the same temperature and evaluated in the same manner as the Example 1. However, the composition after UV irradiation maintained liquid state with the 0% of gel-fraction even after the 10 times of UV irradiation.

Comparative Example 12

N-hexylmaleimide was admixed with dipentaerythritol hexaacrylate (marketed by Nippon Kayaku Co., Ltd.; trade name: KAYARAD-DPHA) in a 1:1-weight ratio to form the active energy ray curable composition.

The composition was evaluated in the same manner as the Example 1. However, the composition was not cured completely even after the 8 times of UV irradiation. The gel-fraction was 0% after the 3 times of UV irradiation.

Comparative Example 13

N-hexylmaleimide was admixed with polyethylene glycol 400 diacrylate (marketed by Nippon Kayaku Co., Ltd.; trade name: KAYARAD-PEG400DA) in a 1:1-weight ratio to form the active energy ray curable composition.

The composition was evaluated in the same manner as the Example 1. However, the composition was not cured completely even after the 6 times of UV irradiation. The gel-fraction was 12.5% after the 3 times of UV irradiation.

Comparative Example 14

Isophronebisurethane bis(N-ethylmaleimide) (disclosed in *Polymer Preprints*, vol. 37, pp. 348–349, 1996) was admixed with dicyclopentenyl acrylate (marketed by Hitachi Kasei Co., Ltd.; trade name: FA-511A) in a 3:7-weight ratio. Because isophronebisurethane bis(N-ethylmaleimide) was solid at room temperature and was not dissolved in the acrylate at room temperature, this composition was stirred at 60° C. However, isophronebisurethane bis(N-ethylmaleimide) was not dissolved in the acrylate and the composition was not coated on a glass plate flatly at the same temperature.

Comparative Example 15

N,N'-4,9-dioxa-1,12-bismaleimidododecane (disclosed in *Polymer Preprints*, vol. 37, pp. 348–349, 1996) was admixed with dicyclopentenyl acrylate (marketed by Hitachi Kasei Co., Ltd.; trade name: FA-511A) in a 1:1-weight ratio. Because N,N'-4,9-dioxa-1,12-bismaleimidododecane was solid at room temperature and was not dissolved in the acrylate at room temperature, N,N'-4,9-dioxa-1,12-bismaleimidododecane was dissolved in the acrylate at 60° C. for coating the film on a glass plate. The composition was coated on a glass plate at the same temperature and evaluated in the same manner as the Example 1. However, the composition was not cured completely even after the 4 times of UV irradiation. The gel-fraction was 51.9% after the 3 times of UV irradiation.

Comparative Example 16

N,N'-4,9-dioxa-1,12-bismaleimidododecane (disclosed in *Polymer Preprints*, vol. 37, pp. 348–349, 1996) was admixed with polyethylene glycol 400 diacrylate (marketed by Nippon Kayaku Co., Ltd.; trade name: KAYARAD-PEG400DA) in a 1:1-weight ratio. Because N,N'-4,9-dioxa-1,12-bismaleimidododecane was solid at room temperature and was not dissolved in the acrylate at room temperature, N,N'-4,9-dioxa-1,12-bismaleimidododecane was dissolved in acrylate at 60° C. for coating the film on a glass plate. The composition was coated on a glass plate at the same temperature and evaluated in the same manner as the Example 1. However, the composition was not cured completely even after the 4 times of UV irradiation. The gel-fraction was 45.7% after the 3 times of UV irradiation.

TABLE 4

| | Maleimide derivative represented by formula (1) | Other curable compound | UV curing property (times) | Gel-fraction (%) | Pencil hardness |
|---|---|---|---|---|---|
| Example 24 | (A) | THE-330 | 1 | 98.9 | 2B |
| Example 25 | (A) | DPHA | 2 | 92.8 | H |
| Example 26 | (A) | FA-511A | 2 | 99.4 | 4B |
| Example 27 | (A) | IBXA | 2 | 97.8 | 4B |
| Example 28 | (A) | V-5500 | 1 | 93.6 | 4B |
| Example 29 | (A) | V-4200 | 1 | 99.0 | 4B |
| Example 30 | (A) | M-5600 | 2 | 93.4 | 4B |
| Example 31 | (A) | M-8060 | 2 | 98.8 | HB |
| Example 32 | (A) | TMM-300 | 2 | 95.6 | 4B |

TABLE 5

| | Maleimide derivative represented by formula (1) | Other curable compound | UV curing property (times) | Gel-fraction (%) | Pencil hardness |
|---|---|---|---|---|---|
| Example 33 | (C) | DPHA | 2 | 98.0 | 2H |
| Example 34 | (C) | PEG400-DA | 2 | 99.4 | B |
| Example 35 | (D) | DPRA | 1 | 96.3 | 4B |
| Example 36 | (D) | TMPTA | 2 | 98.1 | 4B |
| Example 37 | (I) | DPHA | 2 | 82.6 | 2B |
| Example 38 | (N) | DPHA | 3 | 92.8 | H |

TABLE 5-continued

| | Maleimide derivative represented by formula (1) | Other curable compound | UV curing property (times) | Gel-fraction (%) | Pencil hardness |
|---|---|---|---|---|---|
| Example 39 | (N) | KS-HDDA | 3 | 98.3 | 3B |
| Example 40 | (E) | DPHA | 2 | 98.4 | H |
| Example 41 | (E) | TMPTA | 1 | 98.6 | 3B |
| Example 42 | (G) | PEG400-DA | 3 | 93.7 | 2B |
| Example 43 | (G) | V-4200 | 1 | 94.2 | HB |

TABLE 6

| | Comparative composition | UV curing property (times) | Gel-fraction (%) | Pencil hardness |
|---|---|---|---|---|
| Comparative Example 10 | EMI + DPHA | 10< | 0 | — |
| Comparative Example 11 | EMI + V-5500 | 10< | 0 | — |
| Comparative Example 12 | HMI + DPHA | 9 | 0 | — |
| Comparative Example 13 | HMI + PEG400-DA | 7 | 12.5 | — |
| Comparative Example 14 | IPBUBMI + FA-511A | — | — | — |
| Comparative Example 15 | 4,9DOMI + FA-511A | 5 | 51.9 | 4B> |
| Comparative Example 16 | 4,9DOMI + PEG400-DA | 5 | 45.7 | 4B> |

In Table 6, "-" indicates that the evolution of UV curing property of composition, and gel-fraction and pencil hardness of the film were impossible because of no cured film or partially cured film.

Explanation of the compounds in Tables 4 to 6:
(A)~(N): The maleimide derivatives represented by formula (1) synthesized in Manufacturing Examples 6 to 19

THE-330: trimethylolpropane triacrylate modified by three equivalent of ethylene oxide (marketed by Nippon Kayaku Co., Ltd.; trade name:KAYARAD-THE330)

DPHA: dipentaerythritol hexaacrylate (marketed by Nippon Kayaku Co., Ltd.; trade name: KAYARAD-DPHA)

FA-511A: dicyclopentenyl acrylate (marketed by Hitachi Kasei Co., Ltd.; trade name:FA-511A)

IBXA: isobornyl acrylate (marketed by Osaka Organic Chemical Industry; trade name: IBXA)

V-5500: modified bisphenol A diacrylate (marketed by Dainippon Ink and Chemicals. Inc.; trade name:V-5500)

PEG400-DA: polyethylene glycol 400 diacrylate (marketed by Nippon Kayaku Co., Ltd.; trade name: KAYARAD-PEG400DA)

V-4200: urethane diacrylate (marketed by Dainippon Ink and Chemicals. Inc.; trade name:V-4200)

M-5600: polyester acrylate (marketed by Toagosei Co., Ltd.; trade name: M-5600)

M-8060: polyester acrylate (marketed by Toagosei Co., Ltd.: trade name: M-8060)

TMM-300: trimethylolpropane trimethacrylate (marketed by Dainippon Ink and Chemicals. Inc.; trade name: LUMICURE TMM-300)

TMPTA: trimethylolpropane triacrylate (marketed by Nippon Kayaku Co., Ltd.; trade name: KAYARAD-TMPTA)

KS-HDDA: hexanediol diacrylate (marketed by Nippon Kayaku Co., Ltd.; trade name: KS-HDDA)

EMI: N-ethylmaleimide (marketed by Kanto Chemical Co., Ltd.)

HMI: N-hexylmaleimide

IPBUBMI: isophoronebisurethane bis(N-ethylmaleimide)

4,9DOMI: N,N'-4,9-dioxa-1,12-bismaleimidododecane

It is obvious from Tables 4 to 6 that the active energy ray curable compositions comprising the maleimide derivatives represented by formula (1) of the present invention are easily cured by UV irradiation with the flat clear coatings in the absence of photoinitiator. In contrast, it is clear that the compositions applied to Comparative Examples 10 to 16 have serious disadvantages of low solubility to the acrylates at room temperature, low reactivity under UV irradiation, rough surface of the coating, and the like.

Example 44

The maleimide derivative (A) represented by formula (3) synthesized in Manufacturing Example 6 was admixed with cyclohexanedimethanol divinyl ether (marketed by ISP Technologies Inc.; trade name: Rapi-Cure CHVE) in a 0.876:0.134-weight ratio to form the active energy ray curable composition (A-31).

The active energy ray curable composition (A-31) was coated on an acrylic plate to form a film with the thickness of 100 $\mu$m. UV irradiation was conducted by a conveyor-type medium-pressure-mercury-lamp (80 W/cm; marketed by Eye Graphics Co., Ltd.) in air, in the conditions that the lamp height was 15 cm and the conveyor speed was 40 m/min. UV exposure dose for 1 pass measured by the industrial UV checker (marketed by Topcon Co., Ltd.; trade name: UVR-T37) was 32 mJ/cm$^2$. The number of irradiation times for curing the film to be tack-free was evaluated. Moreover, gel-fraction and pencil hardness of the film were evaluated in the same manner as Example 1. The results are summarized in Table 7.

Example 45

The maleimide derivative (A) represented by formula (3) synthesized in Manufacturing Example 6 was admixed with the vinyl ether (a) represented by formula (18) synthesized in Manufacturing Example 21 in a 0.754:0.246-weight ratio to form the active energy ray curable composition (A-32).

UV curing property of the composition (A-32), and gel-fraction and pencil hardness of the cured composition (A-32) were evaluated in the same manner as Example 44, except that curable composition (A-32) was applied in place of curable composition (A-31). The results are summarized in Table 7.

Example 46

The maleimide derivative (A) represented by formula (3) synthesized in Manufacturing Example 6 was admixed with the vinyl ether (c) represented by formula (20) synthesized in Manufacturing Example 23 in a 0.453:0.547-weight ratio to form the active energy ray curable composition (A-33).

UV curing property of the composition (A-33), and gel-fraction and pencil hardness of the cured composition (A-33) were evaluated in the same manner as Example 44, except that curable composition (A-33) was applied in place of curable composition (A-31). The results are summarized in Table 7.

Example 47

The maleimide derivative (D) represented by formula (6) synthesized in Manufacturing Example 9 was admixed with the vinyl ether (a) represented by formula (18) synthesized in Manufacturing Example 21 in a 0.834:0.166-weight ratio to form the active energy ray curable composition (A-34).

UV curing property of the composition (A-34), and gel-fraction and pencil hardness of the cured composition (A-34) were evaluated in the same manner as Example 44, except that curable composition (A-34) was applied in place of curable composition (A-31). The results are summarized in Table 7.

Example 48

The maleimide derivative (I) represented by formula (11) synthesized in Manufacturing Example 14 was admixed with cyclohexanedimethanol divinyl ether (marketed by ISP Technologies Inc.; trade name: Rapi-Cure CHVE) in a 0.776:0.234-weight ratio to form the active energy ray curable composition (A-35).

UV curing property of the composition (A-35), and gel-fraction and pencil hardness of the cured composition (A-35) were evaluated in the same manner as Example 44, except that curable composition (A-35) was applied in place of curable composition (A-31). The results are summarized in Table 7.

Comparative Example 17

N-tert-butylmaleimide (TBMI; disclosed in *Synthetic. Communications.*, vol. 20, pp. 1607–1610, 1990) was admixed with 4-hydroxybutyl vinyl ether (marketed by ISP Technologies Inc.; trade name: Rapi-Cure HBVE) in a 0.569:0.431-weight ratio to form the active energy ray curable composition (B-4).

UV curing property of the composition (B-4) was evaluated in the same manner as Example 44, except that curable composition (B-4) was applied in place of curable composition (A-31). However, the composition (B-4) after UV irradiation maintained liquid state even after the 10 times of UV irradiation.

Comparative Example 18

N-hexylmaleimide (HMI; disclosed in *Polym Mater. Sci. Eng.*, vol. 72, pp. 470–472, 1995) was admixed with 4-hydroxybutyl vinyl ether (marketed by ISP Technologies Inc.; trade name: Rapi-Cure HBVE) in a 0.609:0.391-weight ratio to form the active energy ray curable composition (B-5).

UV curing property of the composition (B-5) was evaluated in the same manner as Example 44, except that curable composition (B-5) was applied in place of curable composition (A-31). However, the composition (B-5) was not formed flatly coating even after the 10 times of UV irradiation.

Comparative Example 19

N-hexylmaleimide (HMI; disclosed in *Polym. Mater. Sci. Eng.*, vol. 72, pp. 470–472, 1995) was admixed with cyclohexane dimethanol divinyl ether (marketed by ISP Technologies Inc.; trade name: Rapi-Cure CHVE) in a 0.649:0.351-weight ratio to form the active energy ray curable composition (B-6).

UV curing property of the composition (B-6) was evaluated in the same manner as Example 44, except that curable composition (B-6) was applied in place of curable composition (A-31). However, the composition (B-6) was not formed flatly coating even after the 10 times of UV irradiation.

Example 49

The maleimide derivative (H) represented by formula (10) synthesized in Manufacturing Example 13 was admixed with trimethylolpropane tri vinyl ether (marketed by Ardrich Chemical Co., Inc.) in a 0.818:0.182-weight ratio to form the active energy ray curable composition (A-36).

The active energy ray curable composition (A-36) was coated on an acrylic plate to form a film with the thickness of 50 μm. UV irradiation was conducted by a conveyor-type medium-pressure-mercury-lamp (80 W/cm; marketed by Eye Graphics Co., Ltd.) in air, in the conditions that the lamp height was 15 cm and the conveyor speed was 40 m/min. UV exposure dose for 1 pass measured by the industrial UV checker (marketed by Topcon Co., Ltd.; trade name: UVR-T37) was 32 mJ/cm$^2$. The number of irradiation times for curing the film to be tack-free was evaluated. Moreover, gel-fraction and pencil hardness of the film were evaluated in the same manner as Example 1. The results are summarized in Table 8.

Example 50

The maleimide derivative (K) represented by formula (13) synthesized in Manufacturing Example 16 was admixed with cyclohexanedimethanol divinyl ether (marketed by ISP Technologies Inc.; trade name: Rapi-Cure CHVE) in a 0.734:0.266-weight ratio to form the active energy ray curable composition (A-37).

UV curing property of the composition (A-37), and gel-fraction and pencil hardness of the cured composition (A-37) were evaluated in the same manner as Example 49, except that curable composition (A-37) was applied in place of curable composition (A-36). The results are summarized in Table 8.

Example 51

The maleimide derivative (M) represented by formula (15) synthesized in Manufacturing Example 18 was admixed with the vinyl ether (b) represented by formula (19) and prepared in Manufacturing Example 22 in a 0.622:0.378-weight ratio to form the active energy ray curable composition (A-38).

UV curing property of the composition (A-38), and gel-fraction and pencil hardness of the cured composition (A-38) were evaluated in the same manner as Example 49, except that curable composition (A-38) was applied in place of curable composition (A-36). The results are summarized in Table 8.

Comparative Example 20

UV curing property was evaluated in the same manner as Example 49, except that curable composition (B-4) prepared in Comparative Example 17 was applied in place of curable composition (A-36). However, the composition (B-4) after UV irradiation maintained liquid state even after the 10 times of UV irradiation.

Comparative Example 21

UV curing property was evaluated in the same manner as Example 49, except that curable composition (B-5) prepared in Comparative Example 18 was applied in place of curable composition (A-36). However, the composition (B-5) was not formed flatly coating even after the 10 times of UV irradiation.

Comparative Example 22

UV curing property was evaluated in the same manner as Example 49, except that curable composition (B-6) prepared in Comparative Example 19 was applied in place of curable composition (A-36). However, the composition (B-6) was not formed flatly coating even after the 10 times of UV irradiation.

TABLE 7

|  | Maleimide derivative | Vinyl ether derivative | UV curing property (times) | Gel-fraction (%) | Pencil hardness |
|---|---|---|---|---|---|
| Example 44 | (A) | CHVE | 2 | 95.9 | 4B> |
| Example 45 | (A) | (a) | 2 | 94.3 | 4B> |
| Example 46 | (A) | (c) | 2 | 91.9 | 4B> |
| Example 47 | (D) | (a) | 3 | 81.6 | 4B> |
| Example 48 | (I) | CHVE | 2 | 74.9 | 4B> |
| Comparative Example 17 | TBMI | HBVE | No cured | — | — |
| Comparative Example 18 | HMI | HBVE | Impossible to form film | — | — |
| Comparative Example 19 | HMI | CHVE | Impossible to form film | — | — |

TABLE 8

|  | Maleimide derivative | Vinyl ether derivative | UV curing property (times) | Gel-fraction (%) | Pencil hardness |
|---|---|---|---|---|---|
| Example 49 | (H) | TMPTV | 2 | 91.2 | 4B> |
| Example 50 | (K) | CHVE | 1 | 96.5 | F |
| Example 51 | (M) | (b) | 1 | 99.5 | 3B> |
| Comparative Example 20 | TBMI | HBVE | No cured | — | — |
| Comparative Example 21 | HMI | HBVE | Impossible to form film | — | — |
| Comparative Example 22 | HMI | CHVE | Impossible to form film | — | — |

In Table 7 and 8, "-" indicates that the evolution of gel-fraction and pencil hardness of the film were impossible because of no cured film or partially cured film.

Explanation of the compounds in Tables 7 to 8:
(A)~(M): The maleimide derivatives represented by formula (1) synthesized in Manufacturing Examples 6 to 18
(a)~(c): The vinyl ether synthesized in Manufacturing Examples 21 to 23
CHVE: cyclohexanedimethanol divinyl ether (marketed by ISP Technologies Inc.; trade name: Rapi-Cure CHVE)
HBVE: 4-hydroxybutyl vinyl ether (marketed by ISP Technologies Inc.; trade name: Rapi-Cure HBVE)
TBMI: N-tert-butylmaleimide
HMI: N-hexylmaleimide
TMPTV: trimethylolpropane trivinyl ether (marketed by Ardrich Chemical Co., Inc.)

It is obvious from Tables 7 and 8, that the active energy ray curable compositions comprising the maleimide derivatives represented by formula (1) of the present invention are easily cured by UV irradiation with the flat clear coatings in the absence of photoinitiator. In contrast, it is clear that the compositions applied to Comparative Examples 10 to 16 comprising the well-known maleimide compounds and the compounds having vinyl ether groups used in Comparative Examples 17 to 22 have serious disadvantages of low reactivity under UV irradiation and rough surface of the coating.

What is claimed is:
1. An active energy ray curable composition comprising a maleimide derivative represented by formula (1):

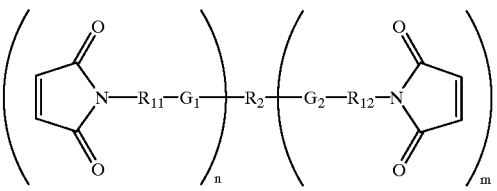

wherein
m and n each represent an integer of 1 to 5, and the total of m and n is 6 or smaller, $R_{11}$ and $R_{12}$ each represent a linking group selected from the group consisting of
① an alkylene group,
② an alicyclic group, and
③ a cycloalkylalkyene group,
$G_1$ represents

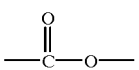

group and $G_2$ represents

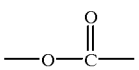

group, $R_2$ represents a linking chain having a number average molecular weight of 100 to 100,000 selected from the group consisting of (A) a (poly)ether linking chain and (B) a (poly)ester linking chain in which at last one organic group selected from the group consisting of
① a straight chain alkylene group having 3–24 carbon atoms,
② a branched alkylene group,
③ an alkylene group having a hydroxyl group, and
④ an alicyclic group,
is connected via at least one linkage selected from the group consisting of (a) an ether linkage and (b) an ester linkage where $R_2$ and $G_1$ as well as $R_2$ and $G_2$ form a carboxylic acid ester linkage.

2. The active energy ray curable composition according to claim 1, wherein $R_2$ in the formula (1) is a (poly)ether linking chain having an average molecular weight of 100 to 100,000, and comprising a repeating unit containing at least one group selected from the group consisting of
① a straight chain alkylene group having 3 to 24 carbon atoms,
② a branched alkylene group having 2 to 24 carbon atoms, and
③ an alkylene group having a hydroxyl group and having 2 to 24 carbon atoms.

3. The active energy ray curable composition according to claim 1, wherein $R_2$ in the formula (1) is a (poly)ester linking chain having an average molecular weight of 100 to 100,000, and comprising a repeating unit containing at least one group selected from the group consisting of
① a straight chain alkylene group having 3 to 24 carbon atoms,
② a branched alkylene group having 2 to 24 carbon atoms, and
③ an alkylene group having a hydroxyl group and having 2 to 24 carbon atoms.

4. An active energy ray curable composition according to claim 1 comprising a maleimide derivative represented by the formula:

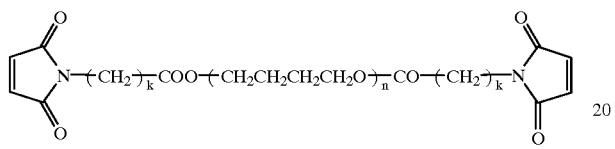

wherein k represents an integer of 1 to 12.

5. An active energy ray curable composition comprising (I) a maleimide derivative represented by formula (1) according to claim 1 and (II) a compound copolymerizable with the said maleimide group.

6. An active energy ray curable composition according to claim 5 comprising a maleimide derivative represented by the formula:

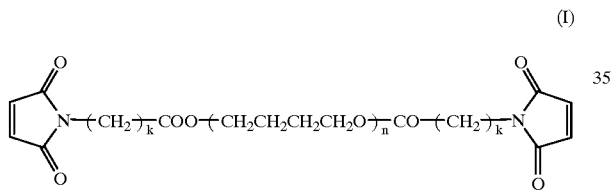

wherein k represents an integer of 1 to 12, and
(II) a compound that can form a copolymer with a maleimide group.

7. The active energy ray curable composition according to claim 5, wherein a said compound copolymerizable with the maleimide group comprises at least one compound selected from the group consisting of
① a compound having at least one group selected from the group consisting of acryloyloxy group and methacryloyloxy group, and
② a compound having vinyl ether group.

8. The active energy ray curable composition according to claim 7, wherein a said compound having at least one group selected from the group consisting of acryloyloxy group and methacryloyloxy group comprises at least one compound selected from the group consisting of
(A-1) a (poly)ester (meth)acrylate,
(A-2) an urethane (meth)acrylate,
(A-3) an epoxy (meth)acrylate,
(A-4) a (poly)ether (meth)acrylate,
(A-5) at least one compound selected from the group consisting of an alkyl (meth)acrylate, an alkylene (meth)acrylate,
(A-6) a (meth)acrylate having aromatic group, and
(A-7) a (meth)acrylate having alicyclic group.

9. The active energy ray curable composition according to claim 7, wherein a said compound having vinyl ether group comprises at least one compound selected from the group consisting of
(B-1) an alkyl vinyl ether having a terminal group substituted with at least one selected from the group consisting of a hydrogen atom, a halogen atom, a hydroxyl group, and an amino group,
(B-2) a cycloalkyl vinyl ether having a terminal group substituted with at least one selected from the group consisting of a hydrogen atom, a halogen atom, a hydroxyl group, and an amino group, and
(B-3) at least one vinyl ether selected from the group consisting of a monovinyl ether, a divinyl ether, and a polyvinyl ether in which a vinyl ether group is connected with alkylene group; and in which a vinyl ether group is connected with at least one group with and without substituent selected from the group consisting of alkyl group, cycloalkyl group, and aromatic group, via at least one linkage selected from the group consisting of an ether linkage, an urethane linkage, and an ester linkage.

10. A method for curing an active energy ray curable composition according to one claim from claims 2, 3–9 and 1 which comprises irradiation of an active energy ray curable composition comprising a maleimide derivative represented by formula (1) with an active energy ray in the absence of an additional photoinitiator:

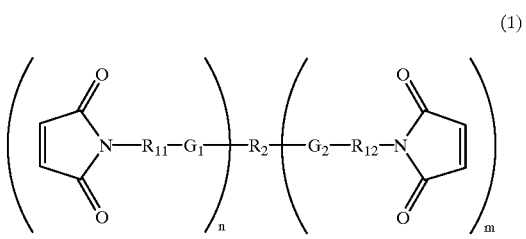

wherein
m and n each represent an integer of 1 to 5, and the total of m and n is 6 or smaller, $R_{11}$ and $R_{12}$ each represent a linking group selected from the group consisting of
① an alkylene group,
② an alicyclic group, and
③ a cycloalkylalkyene group
$G_1$ represents

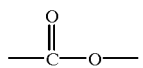

group and $G_2$ represents

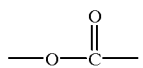

group, $R_2$ represents a linking chain having an average molecular weight of 100 to 100,000 selected from the group consisting of (A) a (poly)ether linking chain and (B) a (poly)ester linking chain in which at least one organic group selected from the group consisting of
① a straight chain alkylene group having 3–24 carbon atoms, ② a branched alkylene group,
③ an alkylene group having a hydroxyl group, and
④ an alicyclic group,
is connected via at least one linkage selected from the group consisting of (a) an ether linkage and (b) an ester linkage where $R_2$ and $G_1$ as well as $R_2$ and $G_2$ form a carboxylic acid ester linkage.

11. The methhod for curing an active energy ray curable composition according to claim 10, wherein the active energy ray is ultraviolet light.

* * * * *